US011904889B1

(12) United States Patent
Lumb et al.

(10) Patent No.: US 11,904,889 B1
(45) Date of Patent: Feb. 20, 2024

(54) VELOCITY ADJUSTMENTS BASED ON ROADWAY SCENE COMPREHENSION

(71) Applicant: GHOST AUTONOMY INC., Mountain View, CA (US)

(72) Inventors: Christopher R. Lumb, San Francisco, CA (US); Prannay Khosla, Mountain View, CA (US); Matthew D. Markel, Allen, TX (US); John Hayes, Mountain View, CA (US)

(73) Assignee: GHOST AUTONOMY INC., Mountain View, CA (US)

( * ) Notice: Subject to any disclaimer, the term of this patent is extended or adjusted under 35 U.S.C. 154(b) by 0 days.

(21) Appl. No.: 18/300,257

(22) Filed: Apr. 13, 2023

Related U.S. Application Data

(60) Provisional application No. 63/422,583, filed on Nov. 4, 2022.

(51) Int. Cl.
*B60W 60/00* (2020.01)
*B60W 40/04* (2006.01)

(52) U.S. Cl.
CPC .......... *B60W 60/001* (2020.02); *B60W 40/04* (2013.01); *B60W 2420/52* (2013.01); *B60W 2552/10* (2020.02); *B60W 2554/4041* (2020.02); *B60W 2554/80* (2020.02)

(58) Field of Classification Search
CPC ............... B60W 60/001; B60W 40/04; B60W 2554/4041; B60W 2554/80; B60W 2552/10; B60W 2420/52
USPC ........................................................ 701/23
See application file for complete search history.

(56) References Cited

U.S. PATENT DOCUMENTS

| | | | |
|---|---|---|---|
| 10,992,755 B1 * | 4/2021 | Tran ....................... | G01S 13/931 |
| 2020/0031340 A1 * | 1/2020 | Tao ...................... | B60W 30/146 |
| 2020/0298885 A1 * | 9/2020 | Yashiro ............. | B60W 60/0053 |
| 2021/0053572 A1 * | 2/2021 | Vasoya ................. | G08G 1/0112 |
| 2021/0082297 A1 * | 3/2021 | Jacobus .................. | H04W 4/02 |
| 2021/0101590 A1 * | 4/2021 | Finelt ................... | G05D 1/0246 |
| 2021/0276572 A1 * | 9/2021 | Du ........................ | B60W 40/04 |
| 2022/0126830 A1 * | 4/2022 | Yu ................... | B60W 30/18159 |
| 2022/0219701 A1 * | 7/2022 | Chikamori ...... | B60W 30/18163 |
| 2022/0223036 A1 * | 7/2022 | Chikamori ....... | G08G 1/096716 |
| 2022/0223041 A1 * | 7/2022 | Chikamori ....... | G08G 1/096827 |

(Continued)

FOREIGN PATENT DOCUMENTS

WO WO-2021116752 A1 * 6/2021 ................ B60T 7/22

*Primary Examiner* — Atul Trivedi

(57) ABSTRACT

Velocity adjustments based on roadway scene comprehension may include controlling an ego vehicle traveling in a first lane, wherein the first lane comprises a lane of travel for the ego vehicle of a multilane roadway including at least the first lane and a second lane; capturing object ranges by the ego vehicle using at least a first sensor corresponding to a first sensor type; identifying a first vehicle operating in the second lane from the first sensor; determining a first velocity of the first vehicle; generating a first lane flow rate for the second lane from one or more captured object velocities, wherein the lane flow rate of the second lane is based on at least the first velocity of the first vehicle and a traffic density estimation; determining whether to modify an ego vehicle velocity based on the first lane flow rate; and in response to determining whether to modify the ego vehicle velocity, generating instructions for the ego vehicle's velocity.

25 Claims, 21 Drawing Sheets

(56) References Cited

U.S. PATENT DOCUMENTS

| | | | | |
|---|---|---|---|---|
| 2022/0234615 A1* | 7/2022 | Nishino | .................. | G01S 17/08 |
| 2022/0340149 A1* | 10/2022 | Nister | ............... | B60W 50/0205 |
| 2022/0348227 A1* | 11/2022 | Foster | ................. | B60W 30/143 |

* cited by examiner

VELOCITY ADJUSTMENTS BASED ON ROADWAY SCENE COMPREHENSION

CROSS REFERENCE TO RELATED APPLICATION

This is a non-provisional application for patent entitled to a filing date and claiming the benefit of earlier-filed U.S. Provisional Patent Application No. 63/422,583, filed Nov. 4, 2022, herein incorporated by reference in its entirety.

BACKGROUND

Field of the Invention

The field of the invention is vehicle control systems, or, more specifically, methods, apparatus and products for velocity adjustments based on roadway scene comprehension.

SUMMARY

The system provides benefits in safety or comfort. When there is no vehicle in front of an ego vehicle for an extended distance, it may not be desirable for the ego vehicle to accelerate to a target speed. For example, where traffic in other lanes is moving at a different speed than the ego vehicle's lane, it may be unsafe if a predetermined target speed of the autonomously or semi-autonomously operated vehicle does not conform to the behavior of other drivers on the roadway. Further, the disparity of the ego vehicle's speed from the speed of vehicles in adjacent lanes may cause anxiety in the driver or passengers of the vehicle. A dynamic velocity adjustment system may adjust a vehicle's velocity based on ambient velocity, in addition to any obstacles present in front of the ego vehicle.

In an implementation, aspects of a dynamic velocity adjustment system may include controlling an ego vehicle traveling in a first lane, wherein the first lane comprises a lane of travel for the ego vehicle of a multilane roadway including at least the first lane and a second lane; capturing object ranges by the ego vehicle using at least a first sensor corresponding to a first sensor type; identifying a first vehicle operating in the second lane from the first sensor; determining a first velocity of the first vehicle; generating a first lane flow rate for the second lane from one or more captured object velocities, wherein the lane flow rate of the second lane is based on at least the first velocity of the first vehicle and a traffic density estimation; determining whether to modify an ego vehicle velocity based on the first lane flow rate; and in response to determining whether to modify the ego vehicle velocity, generating instructions for the ego vehicle's velocity.

In an implementation, aspects of a dynamic velocity adjustment system may also include capturing, by an ego vehicle on a roadway, radar data related to the roadway using a radar sensor; identifying, based on the radar data, respective positions of one or more detected vehicles on the roadway; identifying, based on the radar data, respective velocities of one or more detected vehicles on the roadway; generating, based on at least the respective velocities and respective positions of the one or more detected vehicles, a roadway scene that indicates a velocity and a position of each detected vehicle on the roadway; determining, based on the roadway scene, a velocity estimation for the roadway scene; and generating, based on at least the velocity estimation for the roadway scene, instructions to adjust an ego vehicle velocity.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

The terminology used herein for the purpose of describing particular examples is not intended to be limiting for further examples. Whenever a singular form such as "a," "an," and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes," and/or "including," when used, specify the presence of the stated features, integers, steps, operations, processes, acts, elements, and/or components, but do not preclude the presence or addition of one or more other features, integers, steps, operations, processes, acts, elements, components, and/or any group thereof. Additionally, when an element is described as "plurality," it is understood to mean two or more of such an element. However, as set forth above, further examples may implement the same functionality using a single element.

It will be understood that when an element is referred to as being "connected" or "coupled" to another element, the elements may be directly connected or coupled or via one or more intervening elements. If two elements A and B are combined using an "or," this is to be understood to disclose all possible combinations, i.e. only A, only B, as well as A and B. An alternative wording for the same combinations is "at least one of A and B." The same applies for combinations of more than two elements.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

Figure 1:
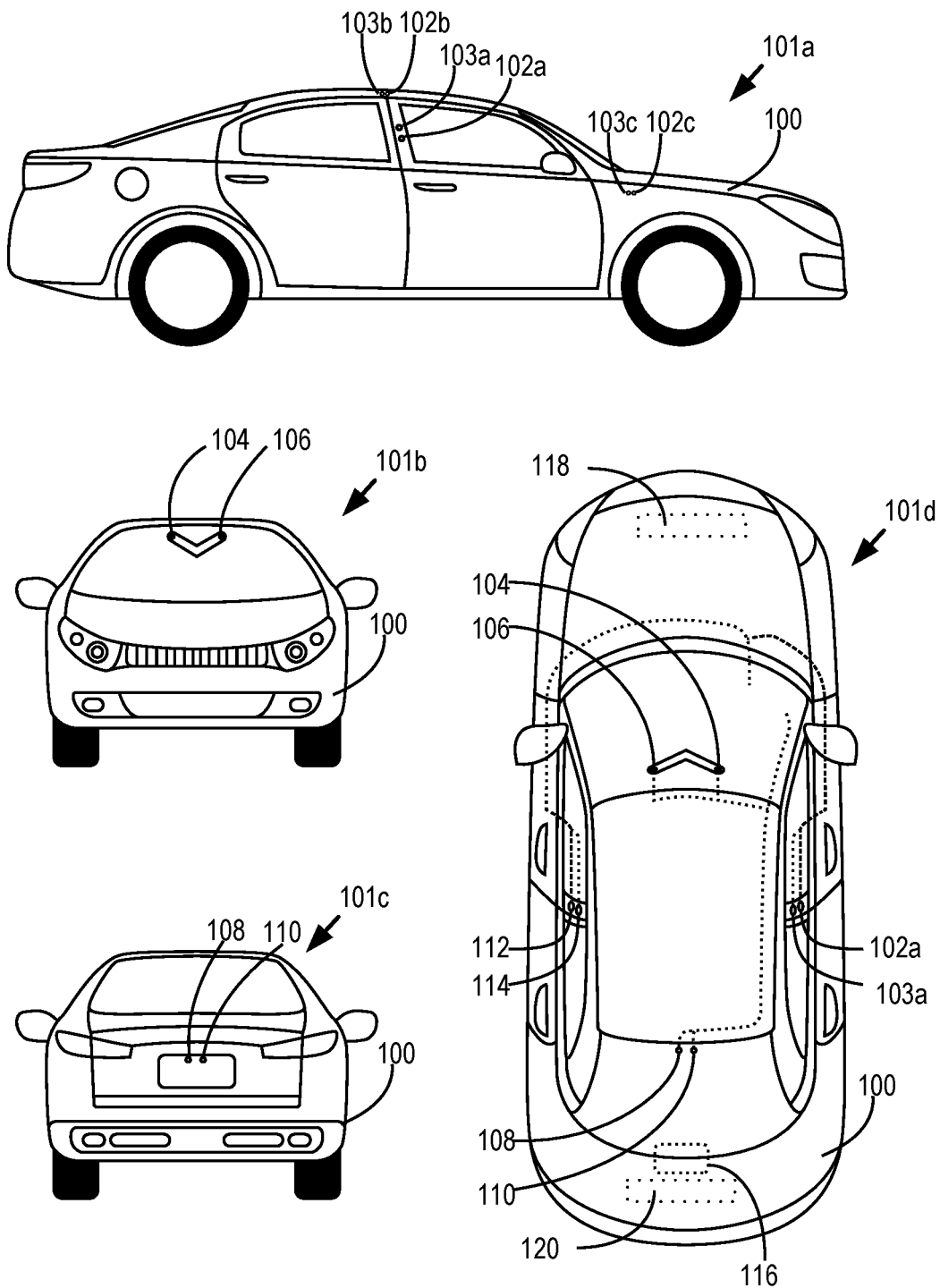
FIG. 1 shows example views of an autonomous vehicle for velocity adjustments based on roadway scene comprehension according to some embodiments.

Autonomous vehicle model training using low-discrepancy sequences may be implemented in an autonomous vehicle. Accordingly, FIG. 1 shows multiple views of an autonomous vehicle 100 configured for autonomous vehicle model training using low-discrepancy sequences according to embodiments of the present disclosure. Right side view 101a shows a right side of the autonomous vehicle 100. Shown in the right-side view 101a are right-facing cameras 102a and 103a, configured to capture image data, video data, and/or audio data of the environment external to the autonomous vehicle 100 from the perspective of the right side of the car. Cameras 102a and 103a are depicted in an exemplary placement location on the autonomous vehicle. In some embodiments, cameras may also be placed in additional or different locations on the autonomous vehicle 100. For example, in some embodiments, cameras 102b and 103b or cameras 102c and 103c may be used instead of or in addition to cameras 102a and 103a.

Front view 101b shows a front side of the autonomous vehicle 100. Shown in the front view 101b are cameras 104 and 106, configured to capture image data, video data, and/or audio data of the environment external to the autonomous vehicle 100 from the perspective of the front of the car. Rear view 101c shows a rear side of the autonomous vehicle 100. Shown in the rear view 101c are cameras 108 and 110, configured to capture image data, video data, and/or audio data of the environment external to the autonomous vehicle 100 from the perspective of the rear of the car. Top view 101d shows a rear side of the autonomous vehicle 100. Shown in the top view 101d are cameras 102a-110. Although the top view 101d shows cameras 102a and 103a as right-facing cameras for the autonomous vehicle 100, in some embodiments, other placement locations for right-facing cameras may also be used, such as those of cameras 102b and 103b or cameras 102b and 103b as described above. Also shown are left-facing cameras 112 and 114, configured to capture image data, video data, and/or audio data of the environment external to the autonomous vehicle 100 from the perspective of the left side of the car. In some embodiments, other placement locations for left-facing cameras may also be used, such as those similar to cameras 102b and 103b or cameras 102b and 103b at corresponding locations on the left side of the car.

As shown, the autonomous vehicle 100 may include pairs of cameras each facing the same direction relative to the autonomous vehicle 100 (e.g., a pair of forward-facing cameras 104 and 106, a pair of rear-facing cameras 108 and 110, a pair of right-facing cameras 102a and 103a, a pair of left-facing cameras 112 and 114). In some embodiments, each of these cameras may be installed or deployed in a stereoscopic configuration such that each pair of cameras may be used for stereoscopic vision using image data from each camera in the camera pair. In other words, each camera in a given pair may face the same direction and have a substantially overlapping field of view such that their respective image data may be used for stereoscopic vision as will be described below.

Further shown in the top view 101d is an automation computing system 116. The automation computing system 116 comprises one or more computing devices configured to control one or more autonomous operations (e.g., autonomous driving operations) of the autonomous vehicle 100. For example, the automation computing system 116 may be configured to process sensor data (e.g., data from the cameras 102a-114 and potentially other sensors), operational data (e.g., a speed, acceleration, gear, orientation, turning direction), and other data to determine an operational state and/or operational history of the autonomous vehicle. The automation computing system 116 may then determine one or more control operations or driving decisions for the autonomous vehicle 100 (e.g., a change in speed or acceleration, a change in brake application, a change in gear, a change in turning or orientation). The automation computing system 116 may also store captured sensor data for later use, transmission, and the like. Operational data of the autonomous vehicle may also be stored in association with corresponding sensor data, thereby indicating the operational data of the autonomous vehicle 100 at the time the sensor data was captured.

Also shown in the top view 101*d* is a radar sensor 118. The radar sensor 118 uses radio waves to detect objects in the environment relative to the autonomous vehicle 100. The radar sensor 118 may also detect or track various attributes of such objects, including distance, velocity, angle of movement and the like. The measurements of the radar sensor 118 may be provided as sensor data (e.g., radar data) to the automation computing system 116.

The radar data from the radar sensor 118 may be used in a variety of ways to facilitate autonomous driving functionality. As an example, the radar sensor 118 may be used in isolation or in conjunction with other sensors, such as camera sensors, to track persistence of various objects. As described herein, persistence includes determining that a particular object identified at a particular instance (e.g., in camera sensor data, in radar sensor 118 data, or both) is the same object in subsequent instances. The radar sensor 118 may also facilitate detecting the size, shape, type, or speed of particular objects. These detected attributes may be correlated with or used to verify estimations of these attributes from camera sensors. As a further example, the radar sensor 118 may facilitate detecting voids in the environment where no object is present.

The radar sensor 118 provides several advantages over camera sensors in detecting the environment relative to the autonomous vehicle 100. For example, the radar sensor 118 provides for greater accuracy at longer distances. The radar sensor 118 may also provide for more accurate estimations of velocity or movement of objects. Moreover, as the radar sensor 118 does not operate in the optical spectrum, performance degradation of the radar sensor 118 in inclement weather is lesser than with camera sensors. Radar sensors 118 also provide some level of vertical resolution in some embodiments, with a tradeoff between distance and vertical resolution.

In some embodiments, the autonomous vehicle 100 may also include an additional radar sensor 120. For example, where the radar sensor 118 is positioned at a front bumper of the autonomous vehicle 100, the autonomous vehicle 100 may also include the additional radar sensor 120 positioned at the rear bumper. Such an additional radar sensor allows for multispectral (e.g., both visual and radar) coverage of the environment at the rear of the car. This provides advantages over ultrasonic sensors at the rear bumper which generally have a limited distance relative to radar.

Although the autonomous vehicle 100 of FIG. 1 is shown as car, it is understood that autonomous vehicles 100 configured for autonomous vehicle model training using low-discrepancy sequences may also include other vehicles, including motorcycles, planes, helicopters, unmanned aerial vehicles (UAVs, e.g., drones), or other vehicles. Moreover, it is understood that additional cameras or other external sensors may also be included in the autonomous vehicle 100.

Autonomous vehicle model training using low-discrepancy sequences in accordance with the present disclosure is generally implemented with computers, that is, with automated computing machinery. For further explanation, therefore, FIG. 2 sets forth a block diagram of automated computing machinery comprising an exemplary automation computing system 116 configured for autonomous vehicle model training using low-discrepancy sequences according to specific embodiments. The automation computing system 116 of FIG. 2 includes at least one computer Central Processing Unit (CPU) package 204 as well as random access memory 206 ('RAM') which is connected through a high-speed memory bus 208 and bus adapter 210 to CPU packages 204 via a front side bus 211 and to other components of the automation computing system 116.

A CPU package 204 may comprise a plurality of processing units. For example, each CPU package 204 may comprise a logical or physical grouping of a plurality of processing units. Each processing unit may be allocated a particular process for execution. Moreover, each CPU package 204 may comprise one or more redundant processing units. A redundant processing unit is a processing unit not allocated a particular process for execution unless a failure occurs in another processing unit. For example, when a given processing unit allocated a particular process fails, a redundant processing unit may be selected and allocated the given process. A process may be allocated to a plurality of processing units within the same CPU package 204 or different CPU packages 204. For example, a given process may be allocated to a primary processing unit in a CPU package 204. The results or output of the given process may be output from the primary processing unit to a receiving process or service. The given process may also be executed in parallel on a secondary processing unit. The secondary processing unit may be included within the same CPU package 204 or a different CPU package 204. The secondary processing unit may not provide its output or results of the process until the primary processing unit fails. The receiving process or service will then receive data from the secondary processing unit. A redundant processing unit may then be selected and allocated the given process to ensure that two or more processing units are allocated the given process for redundancy and increased reliability.

The CPU packages 204 are communicatively coupled to one or more sensors 212. The sensors 212 are configured to capture sensor data describing the operational and environmental conditions of an autonomous vehicle. For example, the sensors 212 may include cameras (e.g., the cameras 102*a*-114 of FIG. 1), accelerometers, Global Positioning System (GPS) radios, LiDAR sensors, radar sensors such as radar sensors 118, 120 of FIG. 1, or other sensors. As described herein, cameras may include solid state cameras with a solid-state shutter capable of measuring photons or a time of flight of photons. For example, a camera may be configured to capture or measure photons captured via the shutter for encoding as images and/or video data. As another example, a camera may emit photons and measure the time of flight of the emitted photons. Cameras may also include event cameras configured to measure changes in light and/or motion of light.

Although the sensors 212 are shown as being external to the automation computing system 116, it is understood that one or more of the sensors 212 may reside as a component of the automation computing system 116 (e.g., on the same board, within the same housing or chassis). The sensors 212 may be communicatively coupled with the CPU packages 204 via a switched fabric 213. The switched fabric 213 comprises a communications topology through which the CPU packages 204 and sensors 212 are coupled via a plurality of switching mechanisms (e.g., latches, switches, crossbar switches, field programmable gate arrays (FPGAs)). For example, the switched fabric 213 may implement a mesh connection connecting the CPU packages 204 and sensors 212 as endpoints, with the switching mechanisms serving as intermediary nodes of the mesh connection. The CPU packages 204 and sensors 212 may be in communication via a plurality of switched fabrics 213. For example, each of the switched fabrics 213 may include the CPU packages 204 and sensors 212, or a subset of the CPU packages 204 and sensors 212, as endpoints. Each switched fabric 213 may also comprise a respective plurality of switching components. The switching components of a given switched fabric 213 may be independent (e.g., not connected) of the switching components of other switched fabrics 213 such that only switched fabric 213 endpoints (e.g., the CPU packages 204 and sensors 212) are overlapping across the switched fabrics 213. This provides redundancy such that, should a connection between a CPU package 204 and sensor 212 fail in one switched fabric 213, the CPU package 204 and sensor 212 may remain connected via another switched fabric 213. Moreover, in the event of a failure in a CPU package 204, a processor of a CPU package 204, or a sensor, a communications path excluding the failed component and including a functional redundant component may be established. In some embodiments, other data links or communications pathways may be used instead of or in conjunction with switched fabrics 213, including cable connections between two endpoints, wireless communications links, or other data links.

The CPU packages 204 and sensors 212 are configured to receive power from one or more power supplies 215. The power supplies 215 may comprise an extension of a power system of the autonomous vehicle 100 or an independent power source (e.g., a battery, a capacitor). The power supplies 215 may supply power to the CPU packages 204 and sensors 212 by another switched fabric 214. The switched fabric 214 provides redundant power pathways such that, in the event of a failure in a power connection, a new power connection pathway may be established to the CPU packages 204 and sensors 212. In some embodiments, other power couplings may be used instead of or in conjunction with the switched fabric 214, such as a direct power cable coupling of a power supply 215 to another component.

Stored in RAM 206 is an autonomy engine 250. As will be described in further detail below, the autonomy engine 250 may enable autonomous driving functionality for the autonomous vehicle 100. Accordingly, in some embodiments, the autonomy engine 250 may perform various data processing or data analytics operations to enable autonomous driving functionality, including the processing of sensor data, generation of driving decisions, and the like.

Figure 2:
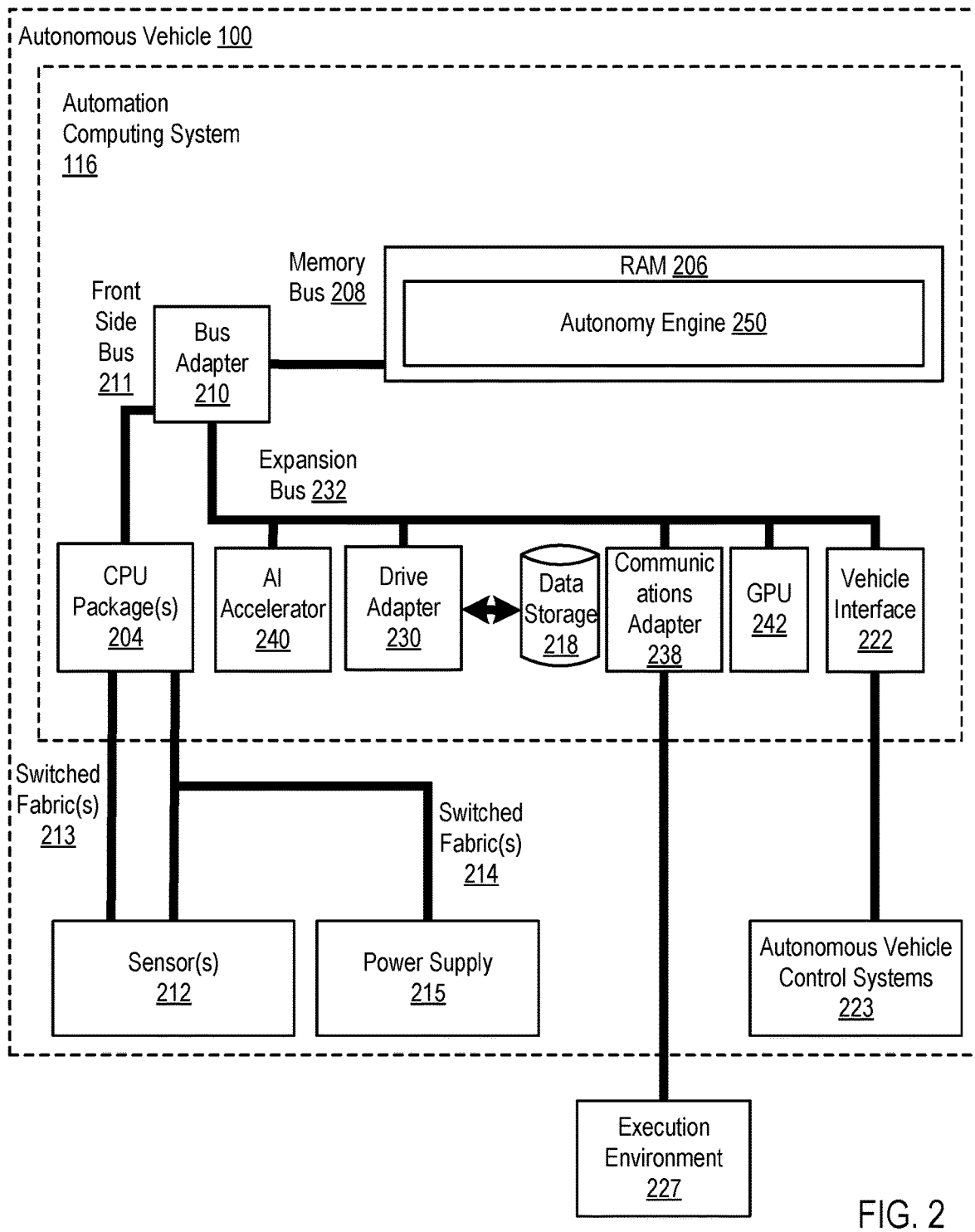
FIG. 2 is a block diagram of an autonomous computing system for velocity adjustments based on roadway scene comprehension according to some embodiments.

The automation computing system 116 of FIG. 2 includes disk drive adapter 230 coupled through expansion bus 232 and bus adapter 210 to CPU package(s) 204 and other components of the automation computing system 116. Disk drive adapter 230 connects non-volatile data storage to the automation computing system 116 in the form of data storage 218. Disk drive adapters 230 useful in computers configured for autonomous vehicle model training using low-discrepancy sequences according to various embodiments include Integrated Drive Electronics ('IDE') adapters, Small Computer System Interface (SCSI') adapters, and others. Non-volatile computer memory also may be implemented for as an optical disk drive, electrically erasable programmable read-only memory (so-called 'EEPROM' or 'Flash' memory), RAM drives, and so on.

The exemplary automation computing system 116 of FIG. 2 includes a communications adapter 238 for data communications with other computers and for data communications with a data communications network. Such data communications may be carried out serially through RS-238 connections, through external buses such as a Universal Serial Bus ('USB'), through data communications networks such as IP data communications networks, and in other ways. Communications adapters implement the hardware level of data communications through which one computer sends data communications to another computer, directly or through a data communications network. Examples of communications adapters useful in computers configured for autonomous vehicle model training using low-discrepancy sequences according to specific embodiments include modems for wired dial-up communications, Ethernet (IEEE 802.3) adapters for wired data communications, 802.11 adapters for wireless data communications, as well as mobile adapters (e.g., cellular communications adapters) for mobile data communications. For example, the automation computing system 116 may communicate with one or more remotely disposed execution environments 227 via the communications adapter 238.

The exemplary automation computing system of FIG. 2 also includes one or more Artificial Intelligence (AI) accelerators 240. The AI accelerator 240 provides hardware-based assistance and acceleration of AI-related functions, including machine learning, computer vision, etc. Accordingly, functionality of the autonomy engine 250 or other operations of the automation computing system 116 may be performed at least in part by the AI accelerators 240.

The exemplary automation computing system of FIG. 2 also includes one or more graphics processing units (GPUs) 242. The GPUs 242 are configured to provide additional processing and memory resources for processing image and/or video data, including encoding, decoding, etc. Accordingly, functionality of the autonomy engine 250 or other operations of the automation computing system 116 may be performed at least in part by the GPUs 242.

Figure 3:
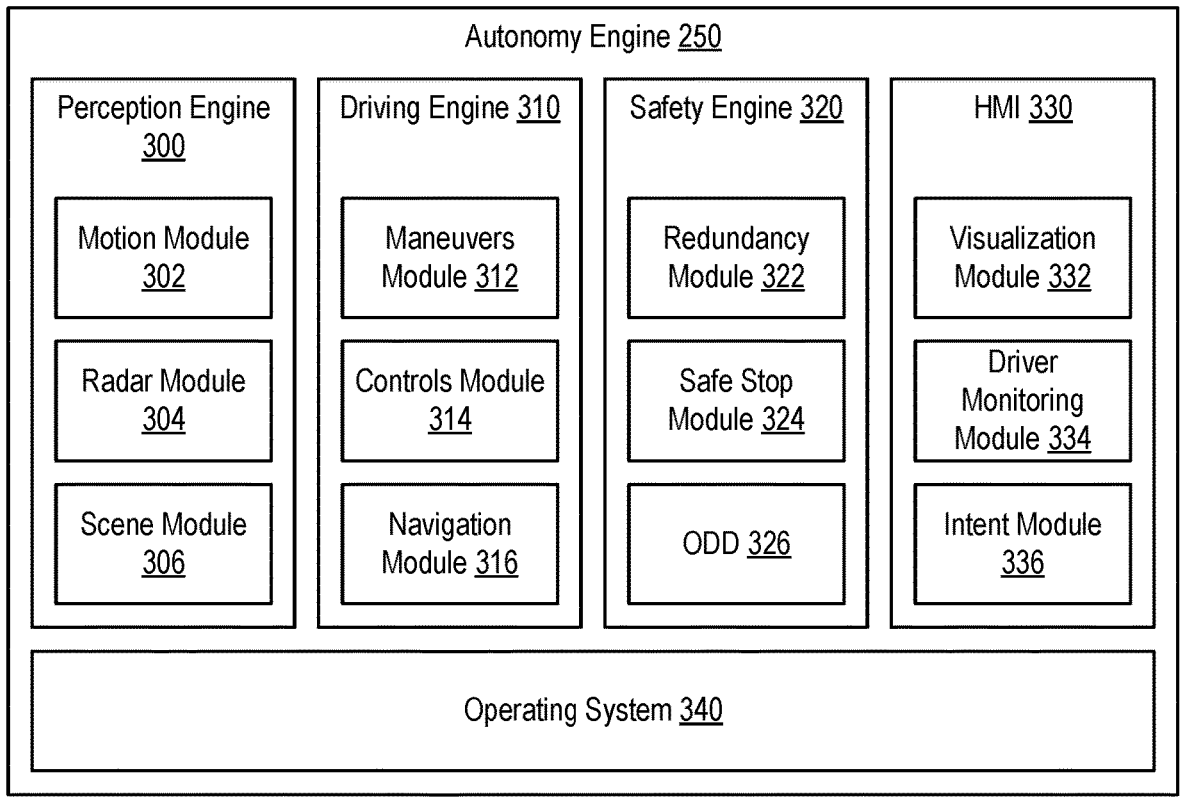
FIG. 3 is a block diagram is a block diagram of an example autonomy engine for velocity adjustments based on roadway scene comprehension according to some embodiments.

FIG. 3 shows a block diagram of an exemplary autonomy engine 250 for autonomous vehicle model training using low-discrepancy sequences according to some embodiments of the present disclosure. The autonomy engine 250 facilitates autonomous driving operations of the autonomous vehicle 100. In some embodiments, the autonomy engine 250 includes a perception engine 300. The perception engine 300 facilitates the capture and processing of sensor data from various sensors 212 in order to determine an environmental state relative to the autonomous vehicle 100. The environmental state may describe, for example, indications of objects in the environment, identification or classification of those objects, velocity and motion direction of those objects, indications and placement of particular road features including lane markers, intersections, turns, and other environmental features.

In some embodiments, the perception engine 300 includes a motion module 302. The motion module 302 uses visual information (e.g., image data from cameras) to detect objects in the environment relative to the autonomous vehicle 100 and calculate various motion attributes of those objects, including distance, velocity, and motion direction. In some embodiments, the motion module 302 may be implemented using one or more neural networks. In some embodiments, the motion module 302 may use a stereoscopic neural network that processes stereoscopic image data from a pair of cameras in a stereoscopic configuration in order to detect objects and calculate their various motion attributes. In some embodiments, the motion module 302 may use a monoscopic neural network that processes non-stereoscopic image data from individual cameras to detect objects and calculate their various motion attributes. In other words, objects may be detected, and their motion attributes calculated, without the need for image data from another camera (e.g., another camera in a stereoscopic configuration).

In some embodiments, the autonomous vehicle 100 may include complementary or fallback camera modalities usable by the motion module 302. This increases the robustness of a perception system of the autonomous vehicle 100 by allowing alternate modalities to perceive environmental conditions. As an example, there may be a left and a right camera in a stereoscopic configuration, with each camera pointed in approximately the same direction that allows the autonomous vehicle 100 to perceive objects in that direction. Different camera modes of the two cameras may allow the cameras to operate stereoscopically, monoscopically using the left camera, monoscopically using the right camera, or a combination of any of these. The autonomous vehicle 100 may use images from the cameras for a variety of purposes, such as to determine existence of objects in the environment, determine distance to objects from the autonomous vehicle, or determine velocities of objects from the autonomous vehicle. Depending on the camera modality, the autonomous vehicle 100 may use different techniques to determine environmental conditions. For example, while using a single camera, the autonomous vehicle 100 may use techniques such as object (or blob) expansion, bounding box expansion, known size position or comparison techniques, defocusing, or other techniques to determine distance or velocity of objects in the environment. When using two cameras, the autonomous vehicle 100 may use techniques such as stereoscopy to determine distance or velocity of objects in the environment.

In some embodiments, the motion module 302 may operate in a stereoscopic and monoscopic modality concurrently. Thus, for a given pair of stereoscopic cameras, the stereoscopic neural network may be used to process image data from the pair of stereoscopic cameras while the monoscopic neural network may be used to process image data from one or both cameras individually. In some embodiments, the output of each neural network may be used to reinforce or otherwise affect the output of the other. For example, a downstream component may use the output of the monoscopic neural network to verify or validate the output of the stereoscopic neural network. As another example, the similarity between output of the stereoscopic neural network and monoscopic neural network may be used to increase confidence scores or other values associated with their respective outputs. In some embodiments, as will be described in more detail below, the stereoscopic and monoscopic neural networks may be executed concurrently such that, should an error occur that prevents the use of stereoscopic imagery (e.g., a camera failure), a monoscopic neural network is already executing and has sufficient image data history so as to be useful in detecting objects and calculating their respective motion attributes.

A radar module 304 processes data from one or more radar sensors 118, 120 to facilitate determining the environmental state relative to the autonomous vehicle 100. In some embodiments, a radar data cube may be generated that defines a three-dimensional space, with each portion in the three-dimensional space either having an object occupying it or being empty. Changes in radar data cubes over time may be used to detect objects and calculate their respective motion attributes as described above. In some embodiments, the radar module 304 may be used to calculate an ambient velocity of the scene relative to the autonomous vehicle 100. The ambient velocity is a collective or aggregate velocity of multiple objects in the environment, such as the autonomous vehicle 100 and other vehicles occupying the road. Accordingly, the ambient velocity may include an ambient velocity for particular lanes or the entire road as detectable by the radar sensors 118, 120.

The scene module 306 determines possible actions or maneuvers performable by the autonomous vehicle 100 based on the environment relative to the autonomous vehicle. The scene module 306 may detect the environment relative to the autonomous vehicle 100 using image data from cameras, radar data, and/or other sensor data. For example, the scene module 306 may detect road features such as lane markers, changes in the road such as curvature, splits or convergence, intersections, and the like as identified in image data from cameras of the autonomous vehicle 100. Such road features may constrain maneuvers performable by the autonomous vehicle 100 (e.g., due to constraints within a particular lane), or present possible maneuvers (e.g., a possible turn at an intersection). As another example, objects identified by the motion module 302 as well as their respective motion attributes may be provided as input to the scene module 306. Such identified objects may affect or constrain possible actions or maneuvers due to risk of collision or other factors.

In some embodiments, one or more trained neural networks may be used by the scene module 306 to determine possible actions or maneuvers of the autonomous vehicle 100. For example, the possible actions or maneuvers may be determined based on a predicted environmental state (e.g., a predicted state of the road). Accordingly, in some embodiments, a neural network may be trained based on various lane and/or intersection configurations in order to predict the state of the road and determine possible actions or maneuvers. In some embodiments, the neural network may be trained using a corpus of data defining all combinations of road and intersections as limited by rules or laws for road construction. This improves the safety and performance of the autonomous vehicle 100 by ensuring that the neural network is trained on any possible road condition or configuration that the autonomous vehicle 100 may encounter. The scene module 306 allows for determination of possible actions for an autonomous vehicle 100 without requiring high-definition maps of the road traversed by the autonomous vehicle 100.

Although described as different modules, in some embodiments, each module of the perception engine 300 may affect the functionality of the other. For example, output of one module may be provided as input to another module, or output of one module may be correlated with output of another module for verification, confidence estimation, and the like. In some embodiments, the neural networks described above may be implemented as separate neural networks or combined into a same network. For example, one or more neural networks of the radar module 304 may be combined with one or more neural networks of the motion module 302 to perform their respective calculations. Various combinations or configurations of such neural networks are contemplated within the scope of the present disclosure.

The driving engine 310 determines and executes maneuvers (e.g., driving decisions) for the autonomous vehicle 100. As described herein, a maneuver describes an action or combination of actions to be performed by the autonomous vehicle 100, particularly with respect to movement of the autonomous vehicle. A maneuver may also be referred to as a driving decision, with such terms being used interchangeably herein. In some embodiments, the driving engine 310 includes a maneuvers module 312. The maneuvers module 312 determines, based on various inputs, a particular maneuver to be executed. For example, the maneuvers module 312 may receive from the scene module 306 an indication of possible maneuvers that may be performed. The maneuvers module 312 may then select a particular maneuver for execution.

In some embodiments, selecting a particular maneuver for execution may be based on costs associated with possible paths. For example, in some embodiments, selecting a particular maneuver may include optimizing one or more cost functions (e.g., by optimizing path costs). In some embodiments, path costs may be determined using one or more lattices with each lattice focusing on a different aspect of the drive (e.g., safety, comfort, efficiency). Maneuvers may then be selected for a path optimized for one or more of the lattices.

In some embodiments, the driving engine 310 includes a controls module 314. A controls module 314 generates control signals to actuate various components in order to perform maneuvers. For example, control signals may be provided via a vehicle interface 222 to autonomous vehicle control systems 223 to actuate acceleration, braking, steering, and the like in order to perform a maneuver. In some embodiments, the maneuvers module 312 may provide a particular maneuver to the controls module 314. The controls module 314 then determines and outputs the particular control signals required to perform the maneuver. As an example, assume that the maneuvers module 312 outputs a maneuver of a lane change to a lane to the left of the autonomous vehicle 100. The controls module 314 may then output a control signal to a steering system to angle the autonomous vehicle 100 some amount to the left. As another example, assume that the maneuvers module 312 outputs a maneuver to perform a right turn at an intersection. The controls module 314 may then output a control signal to the steering system to turn the car to the right and also output a control signal to the braking system to decelerate the autonomous vehicle 100 during the turn.

In some embodiments, the driving engine 310 may include a navigation module 316. The navigation module 316 may determine a route for the autonomous vehicle 100 to travel. The route may be based on a currently selected destination or based on other criteria. The route may be provided, for example, as input to a maneuvers module 312 such that maneuvers may be selected for traveling along the determined route. For example, the determined route may affect one or more cost functions associated with selecting a particular maneuver.

The safety engine 320 implements one or more features to ensure a safe driving experience when in an autonomous driving mode. In some embodiments, the safety engine 320 includes a redundancy module 322. The redundancy module 322 may detect errors associated with particular components of the autonomous vehicle 100. The redundancy module 322 may also perform remedial actions for these errors using redundant components for an erroneous component. For example, in some embodiments, the redundancy module 322 may establish or remove data or power pathways between components using switch fabrics as described above. Thus, the redundancy module 322 may establish data or power pathways to a redundant component when a corresponding component fails. This ensures that the autonomous vehicle 100 may maintain autonomous driving functionality in the event of component failure. In some embodiments, the redundancy module 322 may control different camera modalities as described above. For example, in response to detecting an error associated with a first camera in a stereoscopic configuration with a second camera, the redundancy module 322 may indicate (e.g., to the motion module 302) to operate in a monoscopic modality using the second camera. This allows the autonomous vehicle 100 to maintain autonomous driving functionality in the event of a camera failure, improving overall performance and safety.

In some embodiments, the safety engine 320 includes a safe stop module 324. The safe stop module 324 may cause the autonomous vehicle 100 to execute a safe stop maneuver. A safe stop maneuver is a sequence or combination of one or more maneuvers that will bring the autonomous vehicle 100 to a safe stop. Criteria for what is considered a safe stop may vary according to particular environmental considerations, including a type of road being traversed, traffic conditions, weather conditions, and the like. For example, a safe stop on a busy highway may include directing the vehicle to stop on the shoulder of the highway. As another example, a safe stop in a no or low traffic environment may include bringing the vehicle to an initial stop on the road before a human driver takes control.

The particular maneuvers required to execute the safe stop may be determined by the maneuvers module 312. For example, in addition to determining maneuvers to execute a particular driving path, the maneuvers module 312 may also concurrently determine maneuvers required to execute a safe stop maneuver. Thus, the maneuvers module 312 may continually update a stored sequence of maneuvers to reflect the most recently determined safe stop maneuver. In response to some condition or error state, such as critical component failure or another error that may affect safe autonomous driving, the safe stop module 324 may signal the maneuvers module 312 to execute the most recently determined safe stop maneuver. The maneuvers module 312 may then send to the controls module 314, the various maneuvers to perform the safe stop maneuver.

In some embodiments, the safety engine 320 includes an operational design domain (ODD) 326. The ODD 326 defines various operating conditions in which the autonomous vehicle 100 may operate autonomously. The ODD 326 may include, for example, particular environmental restrictions, geographical restrictions, time-of-day restrictions, and the like. The restrictions of the ODD 326 may correspond to different legal requirements, regulatory requirements, engineering considerations, and the like. The ODD 326 ensures that the autonomous vehicle 100 only operates autonomously within the bounds defined by the ODD 326, improving safety and ensuring conformity with relevant legal and regulatory restrictions. Enforcement of the ODD may include through automatic means.

The autonomy engine 250 also includes a human machine interface (HMI) 330. The HMI 330 presents various content to the driver or other occupants of the autonomous vehicle 100 and monitors the driver for various inputs that may affect driving or other systems of the autonomous vehicle 100. In some embodiments, the HMI 330 includes a visualization module 332. The visualization module 332 generates and presents for display a representation of the environment relative to the autonomous vehicle 100 as perceived by the autonomous vehicle 100 (e.g., based on data from various sensors). For example, the visualization module 332 may present a representation of detected road lanes, objects, or other relevant driving information so that an occupant can understand why the autonomous vehicle 100 is performing a particular task or maneuver. The visualization module 332 may also present for display various information relating to the state of the vehicle, such as cabin temperature, whether lights or windshield wipers are on, and the like. In some embodiments, an interior of the autonomous vehicle 100 may include a display or monitor to which the HMI 330 may provide the information or environmental representation described above.

In some embodiments, the HMI 330 includes a driver monitoring module 334. The driver monitoring module 334 monitors behaviors or actions of a driver using sensors inside and/or outside of the autonomous vehicle 100. Such sensors may include cameras, infrared sensors, pressure sensors, and the like. In other words, the driver monitoring module 334 generates sensor data capturing the driver. The driver monitoring module 334 may thus monitor behaviors or actions of a driver both inside of the vehicle and outside of the vehicle. In some embodiments, the driver monitoring module 334 may also monitor behavior or actions of other occupants of the autonomous vehicle 100. The driver monitoring module 334 may detect behaviors or actions including gestures, voice commands, posture, gaze, and the like.

In some embodiments, the HMI 330 also includes an intent module 336. The intent module 336 derives an intent of the driver using sensor data from the driver monitoring module 334. For example, one or more trained modules or neural networks may derive a particular intent based on sensor data from the driver monitoring module 334. The intent of the driver is an action the driver wishes performed by the autonomous vehicle 100. For example, assume that the driver monitoring module 334 detects a driver outside of the vehicle approaching the trunk. The intent module 336 may determine that the trunk should be opened or unlocked. As another example, assume that the driver monitoring module 334 detects a particular gesture performed by the driver during an autonomous driving mode. The intent module 336 may determine that the gesture indicates that the speed of the vehicle should be increased. Accordingly, in some embodiments, the intent module 336 may generate, based on a determined intent, one or more control signals to actuate one or more components or systems of the autonomous vehicle 100.

In some embodiments, the autonomy engine 250 includes an operating system 340. The operating system 340 may include, for example, UNIX™, Linux™, Microsoft Windows™ Android™, and others, as well as derivatives thereof. In some embodiments, the operating system 340 includes a formally verified operating system 340. Formal verification uses mathematical proof techniques to establish properties or functionality of the operating system 340. For example, formal verification may cover all lines of code or decisions, a range of all possible inputs, or other factors in operating system 340 execution. The use of a formally verified operating system 340 verifies that the operating system 340 will function correctly during operation of the autonomous vehicle 100, thereby establishing the safety and reliability of the operating system 340 during autonomous driving.

The various components of the autonomy engine 250 may be embodied or encoded according to a variety of approaches. For example, the various components and/or subcomponents of the autonomy engine 250 (e.g., the various engines and modules) may be implemented using one or more containers, one or more virtual machines, or by other approaches. Moreover, though the autonomy engine 250 is described with respect to various different engines, modules, and the like, in some embodiments portions of their respective functionality may be implemented by a same or shared module, application, service, and the like.

In some embodiments, one or more components or functions of the autonomy engine 250 may be verified using simulation or other computerized methods. For example, a simulated vehicle in a simulated road environment may be operated using an instance of the autonomy engine 250. Thus, maneuvers or driving decisions by the simulated vehicle may be controlled by the autonomy engine 250. Verification may include determining whether the simulated vehicle operates as expected, satisfies certain conditions (e.g., stays within defined lane parameters, executes maneuvers within prescribed bounds), or other actions. In some embodiments, the autonomy engine 250 may undergo verification using a variety of different scenarios where the simulated vehicle begins operation in some defined simulated environmental state. The defined simulated environmental state may include parameters such as particular road conditions or road features, placement of the simulated vehicle on the road, a speed and direction of the simulated vehicle, placement of other vehicles on the road, speeds of such vehicles, and the like. In some embodiments, the autonomy engine 250 may be verified by encoding these parameters as a multidimensional space and generating a distribution of different simulation scenarios that evenly cover the multidimensional space. This improves the safety of the autonomous vehicle 100 by verifying the autonomy engine 250 across a full and evenly distributed space of possible driving scenarios.

Figure 4:
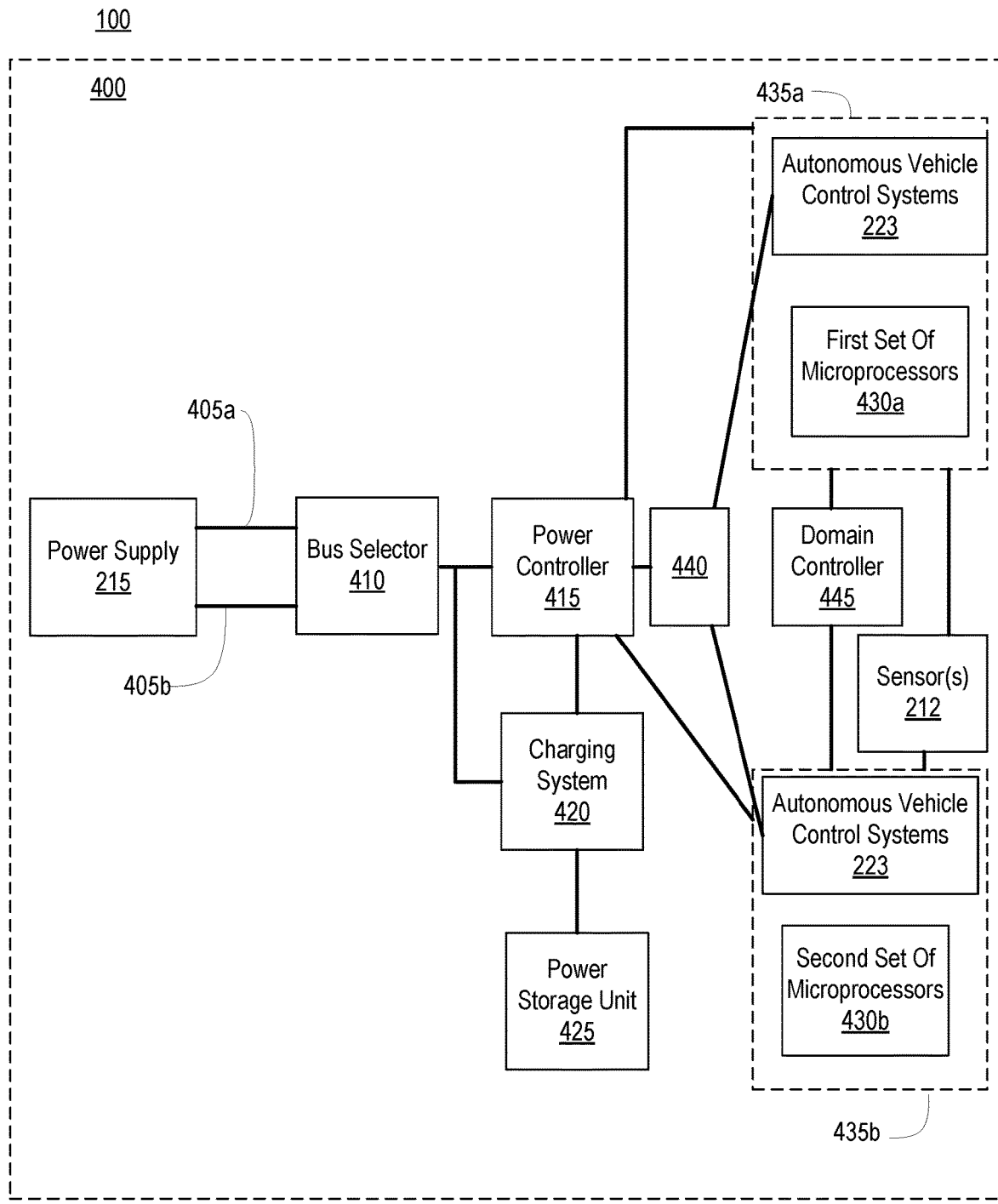
FIG. 4 is example system for redundantly supplying power to one or more microprocessors of an autonomous vehicle according to some embodiments.

FIG. 4 is an example system 400 for redundantly supplying power to one or more microprocessors of an autonomous vehicle 100. The system 400 includes a plurality of buses 405a, 405b (also referred to individually and collectively using reference number 405). Each bus 405 is coupled to the power supply 215 and to a bus selector 410. Further, each bus 405 of the plurality of buses 405 is independent of other buses 405 of the plurality of buses 405. While FIG. 4 shows an embodiment with two buses 405a, 405b, in other embodiments, different numbers of buses 405 are included in the system 400. For example, various embodiments include three buses 405, four buses 405, five buses 405, or any other number of buses 405.

The bus selector 410 selects one of the plurality of buses 405 as an output of the bus selector 410. The bus selector 410 is one or more integrated circuits or other logic circuits that selects one of the buses 405a, 405b as an output based on characteristics of voltage or current detected along bus 405a and bus 405b. For example, the bus selector 410 selects bus 405a as output in response to the bus selector 410 detecting a higher voltage on bus 405a than on bus 405b. Similarly, the bus selector 410 selects bus 405b as output in response to the bus selector 410 detecting a higher voltage on bus 405b than on bus 405a. In various embodiments, the bus selector 410 selects whichever bus 405 coupled to the bus selector 410 having a highest voltage as the output of the bus selector 410.

The output of the bus selector 410 is coupled to a power controller 415, which is also coupled to a power storage unit 425. In some embodiments, the output of the bus selector 410 is coupled to the power storage unit 425. The power controller 415 is a microcontroller, processor, logical circuit, field-programmable gate array (FPGA), or other structure configured to select a power output as one of the outputs of the bus selector 410 or the power storage unit 425. However, in some embodiments, such as the embodiment shown in FIG. 4, the output of the bus selector 410 is coupled to a charging system 420, with the charging system 420 coupled to the power storage unit 425. In some embodiments, the power controller 415 is coupled to the charging system 420, with the charging system 420 coupled to the power storage unit 425. However, in other embodiments, the power controller 415 is directly coupled to the power storage unit 425, and the output of the bus selector 410 is coupled to the charging system 420.

The power controller 415 selects the power output based on the output of the bus selector 410. The power output of the power controller 415 is coupled to at least one of a first power domain 435a or a second power domain 435b, with the first power domain 435a including a first set of microprocessors 430a and the second power domain 435b including a second set of microprocessors 430b. While FIG. 4 shows an example including two power domains, in other embodiments, additional power domains are coupled to the power controller 415 to increase redundancy. The power output selected by the power controller 415 is directed to at least one of the first power domain 435a or the second power domain 435b. In various embodiments, the power output is directed to a single power domain 435, with other power domains 435 not receiving power. In other embodiments, power is provided to a power domain 435a through the power output, with a portion of the power output sufficient for one or more microprocessors in the power domain 435b to operate in a standby mode directed to the power domain 435b In various embodiments, the power controller 415 selects the power output based on a voltage of the output of the bus selector 410. For example, the power controller 415 selects the power output as the output of the bus selector 410 in response to determining the voltage of the output of the bus selector 410 is at least a threshold voltage. In the preceding example, the power controller 415 selects the power output as an output of the power storage unit 425 in response to determining the voltage of the output of the bus selector 410 is less than the threshold voltage. For example, the threshold voltage is a voltage sufficient to operate at least one of the first power domain 435a or the second power domain 435b. In some embodiments, the threshold voltage is specified as a voltage sufficient to operate the first set of microprocessors 430a or the second set of microprocessors 430b for at least a threshold amount of time. The threshold voltage is stored in a memory of the power controller 415 in various embodiments, allowing different systems 400 to specify different threshold voltages for selecting the power output of the power controller 415.

In various embodiments, the threshold voltage stored by the power storage unit 425 is sufficient to power the first power domain 435a or the second power domain 435b for a threshold amount of time for the autonomous vehicle 100 to complete a minimal risk condition. As used herein, a "minimal risk condition" specifies one or more actions for the autonomous vehicle 100 to complete while an autonomous mode to allow a driver to resume manual control of the autonomous vehicle 100 or for the autonomous vehicle 100 to safely come to a stop while in the autonomous mode. In some embodiments, the minimal risk condition specifies the autonomous vehicle 100 moving to an emergency lane or otherwise out of a lane including moving traffic and stopped. In other embodiments, the minimal risk condition specifies the autonomous vehicle 100 travels an off ramp and comes to a stop. As another example, a minimal risk condition specifies the autonomous vehicle 100 enters a lane for traffic moving at a slower speed. In another example, a minimal risk condition specifies the autonomous vehicle 100 perform autonomous control operations for a threshold amount of time to allow a driver to resume manual control of the autonomous vehicle 100. For another example, the minimal risk condition specifies the autonomous vehicle 100 come to a stop in a lane where the autonomous vehicle 100 Is currently travelling. In other embodiments, the minimal risk condition specifies multiple actions for the autonomous vehicle to complete 100. For example, a minimal risk condition specifies the autonomous vehicle 100 complete a maneuver in progress, move to a different lane than a current lane, identify a location out of a flow of traffic (e.g., on a side of a road), come to a stop in the identified location, park, and turn on hazard lights. In different embodiments, different combinations of actions or actions are specified as the minimal risk condition; for example, different autonomous vehicles 100 store information identifying different vehicle-specific minimal risk conditions. Both the first power domain 435a and the second power domain 435b are capable of providing instructions for completing the minimal risk condition.

The charging system 420 provides power from the output of the bus selector 410 to the power storage unit 425. This causes the output of the bus selector 410 to charge the power storage unit 425, allowing the power storage unit 425 to store power from the power supply 215 received via the output of the bus selector 410. In some embodiments, the charging system 420 obtains charging information from the power storage unit 425 and adjusts charging of the power storage unit 425 accordingly. For example, the charging system 420 obtains a current voltage from the power storage unit 425 and determines whether a current voltage of the power storage unit 425 is less than a threshold voltage.

The power storage unit 425 is a device configured to store power. Examples of the power storage unit 425 include a battery or a capacitor. In various embodiments, the power storage unit 425 is configured to store a minimum voltage for operating at least one of the first set of microprocessors 430a or the second set of microprocessors 430b. For example, the power storage unit 425 is configured to store a voltage capable of operating at least one of the first set of microprocessors 430a or the second set of microprocessors 430b for at least a threshold amount of time. The power storage unit 425 receives power from the output of the bus selector 410, so the power storage unit 425 accumulates power received from output of the bus selector 410. This allows the power storage unit 425 to act as an alternative power source that is charged while at least one of the buses 405 is supplying power as the output of the bus selector 410 and is used when the output of the bus selector 410 satisfies one or more criteria (e.g., when the output of the bus selector 410 has less than a threshold voltage). In different embodiments, the power storage unit 425 has different power storage capacities or charges at different rates. While FIG. 4 shows a single power storage unit 425 for purposes of illustration, in other embodiments, the system 400 includes multiple power storage units 425 coupled to the output of the bus selector 410 and to the power controller 415.

In the embodiment shown in FIG. 4, the power output of the power controller is coupled to a control bus 440 that comprises connections between the power controller 415 and each of at least a collection of autonomous vehicle control systems 223 to route power from the power storage unit 425 to at least the collection of autonomous vehicle control systems 223. Inclusion of the control bus 440 simplifies routing of power from the power storage unit 425 to different autonomous vehicle control systems 223. In some embodiments, the threshold amount of power stored by the power storage unit 425 is sufficient to operate the collection of autonomous vehicle control systems 223 and one of the first set of microprocessors 430a or the second set of microprocessors 430b for a sufficient amount of time for the autonomous vehicle 100 to complete a minimum risk condition. The collection of autonomous vehicle control systems 223 includes one or more autonomous vehicle control systems 223 capable of completing a minimal risk condition and capable of modifying movement of the autonomous vehicle 100. For example, the collection of systems 223 includes a braking system and a steering system. One or more lighting systems may be included in the collection of autonomous vehicle control systems 223 in various implementations. The collection of autonomous vehicle control systems 223 excludes one or more autonomous vehicle control systems, such as an entertainment system or a heating and air conditioning control system, in various embodiments.

A domain controller 445 is coupled to the first power domain 435a and to the second power domain 435b. The domain controller 445 includes switching logic that redirects power from the power output of the power controller 415 to the first power domain 435a or to the second power domain 435b based on one or more conditions. For example, the domain controller 445 routes power that the first power domain 435a receives from the power output of the power controller 415 to the second power domain 435b in response to one or more microprocessors in the first power domain 435a providing less than a threshold amount of functionality. In various embodiments, the domain controller 445 monitors the first power domain 435a and the second power domain 435b and determines whether the first power domain 435a or the second power domain 435b is capable of providing instructions for the autonomous vehicle to complete a minimal risk condition using at least the collection of the autonomous vehicle control systems 223 that control movement of the autonomous vehicle 100 while the autonomous vehicle 100 is in an autonomous mode based on instructions provided by the first set of microprocessors 430a or by the second set of microprocessors 430b. In response to determining the first power domain 435a is not capable of providing instructions to at least the collection of autonomous vehicle control systems 223 to complete the minimal risk condition, the domain controller 445 routes power from the first power domain 435a to the second power domain 435b. Similarly, in response to determining the second power domain 435b is not capable of providing instructions to at least the collection of autonomous vehicle control systems 223 to complete the minimal risk condition, the domain controller 445 routes power from the second power domain 435b to the first power domain 435a. The domain controller 445 allows the power output of the power controller 415 to be routed to a power domain 435 capable of completing a minimal risk condition, providing redundancy for the autonomous vehicle completing a minimal risk condition while in an autonomous mode. This allows the domain controller 445 to direct the power output to a power domain 435 capable of executing functionality for completing a minimal risk condition, providing additional safety for a driver of the autonomous vehicle 100.

Figure 5:
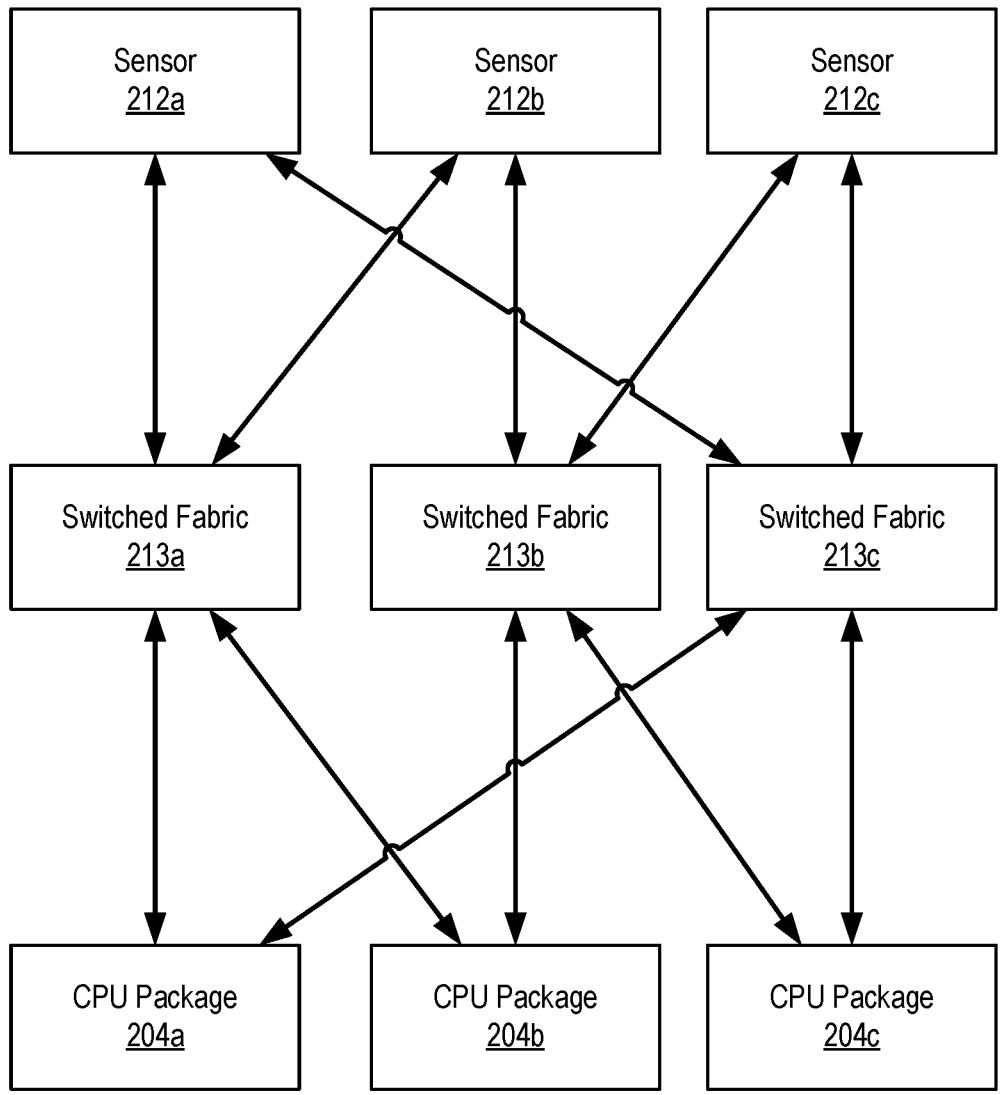
FIG. 5 is a block diagram of a redundant data fabric for velocity adjustments based on roadway scene comprehension according to some embodiments.

FIG. 5 shows an example redundant power fabric for autonomous vehicle model training using low-discrepancy sequences. The redundant power fabric provides redundant pathways for power transfer between the power supplies 215, the sensors 212, and the CPU packages 204. In this example, the power supplies 215 are coupled to the sensors 212 and CPU packages via two switched fabrics 214a and 214b. The topology shown in FIG. 5 provides redundant pathways between the power supplies 215, the sensors 212, and the CPU packages 204 such that power can be rerouted through any of multiple pathways in the event of a failure in an active connection pathway. The switched fabrics 214a and 214b may provide power to the sensors 212 using various connections, including Mobile Industry Processor Interface (MIPI), Inter-Integrated Circuit (I2C), Universal Serial Bus (USB), or another connection. The switched fabrics 214a and 214b may also provide power to the CPU packages 204 using various connections, including Peripheral Component Interconnect Express (PCIe), USB, or other connections. Although only two switched fabrics 214a and 214b are shown connecting the power supplies 215 to the sensors 212 and CPU packages 204, the approach shown by FIG. 5 can be modified to include three, four, five, or more switched fabrics 214. This example redundant power fabric improves the safety and reliability of the autonomous vehicle 100 by allowing for dynamic switching of power pathways to ensure that each component may receive the required power for operation should a power connection be damaged or otherwise negatively impacted.

Figure 6:
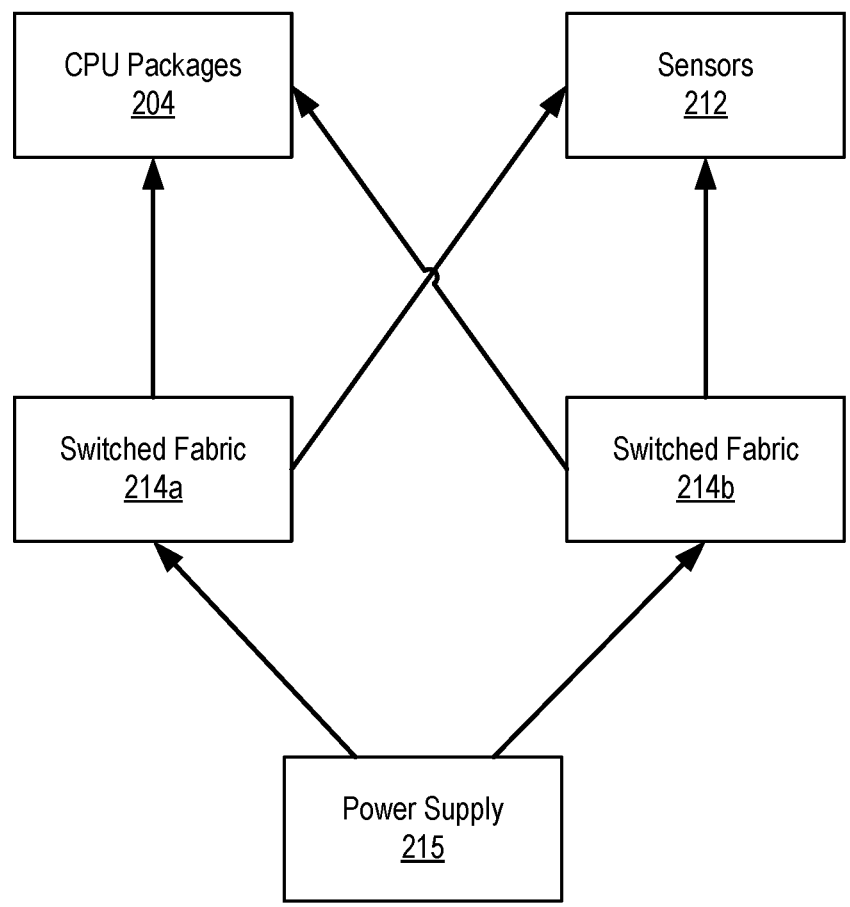
FIG. 6 for velocity adjustments based on roadway scene comprehension according to some embodiments.

FIG. 6 is an example redundant data fabric for autonomous vehicle model training using low-discrepancy sequences. The redundant data fabric provides redundant data connection pathways between sensors 212 and CPU packages 204. In this example view, three CPU packages 204a, 204b, and 204c are connected to three sensors 212a, 212b, and 212c via three switched fabrics 213a, 213b, and 213c. Each CPU package 204a, 204b, and 204c is connected to a subset of the switched fabrics 213a, 213b, and 213c. For example, CPU package 204a is connected to switched fabrics 213a and 213c, CPU package 204b is connected to switched fabrics 213a and 213b, and CPU package 204c is connected to switched fabrics 213b and 213c. Each switched fabric 213a, 213b, and 213c is connected to a subset of the sensors 212a, 212b, and 212c. For example, switched fabric 213a is connected to sensors 212a and 212b, switched fabric 213b is connected to sensor 212b and 212c, and switched fabric 213c is connected to sensors 212a and 212c. Under this topology, each CPU package 204a, 204b, and 204c has an available connection path to any sensor 212a, 212b, and 212c. It is understood that the topology of FIG. 6 is exemplary, and that CPU packages, switched fabrics, sensors, or connections between components may be added or removed while maintaining redundancy. This example redundant data fabric improves the safety and reliability of the autonomous vehicle 100 by allowing for the use of redundant sensors and processors that may be dynamically linked via the redundant data fabric in response to an error or other condition.

Figure 7:
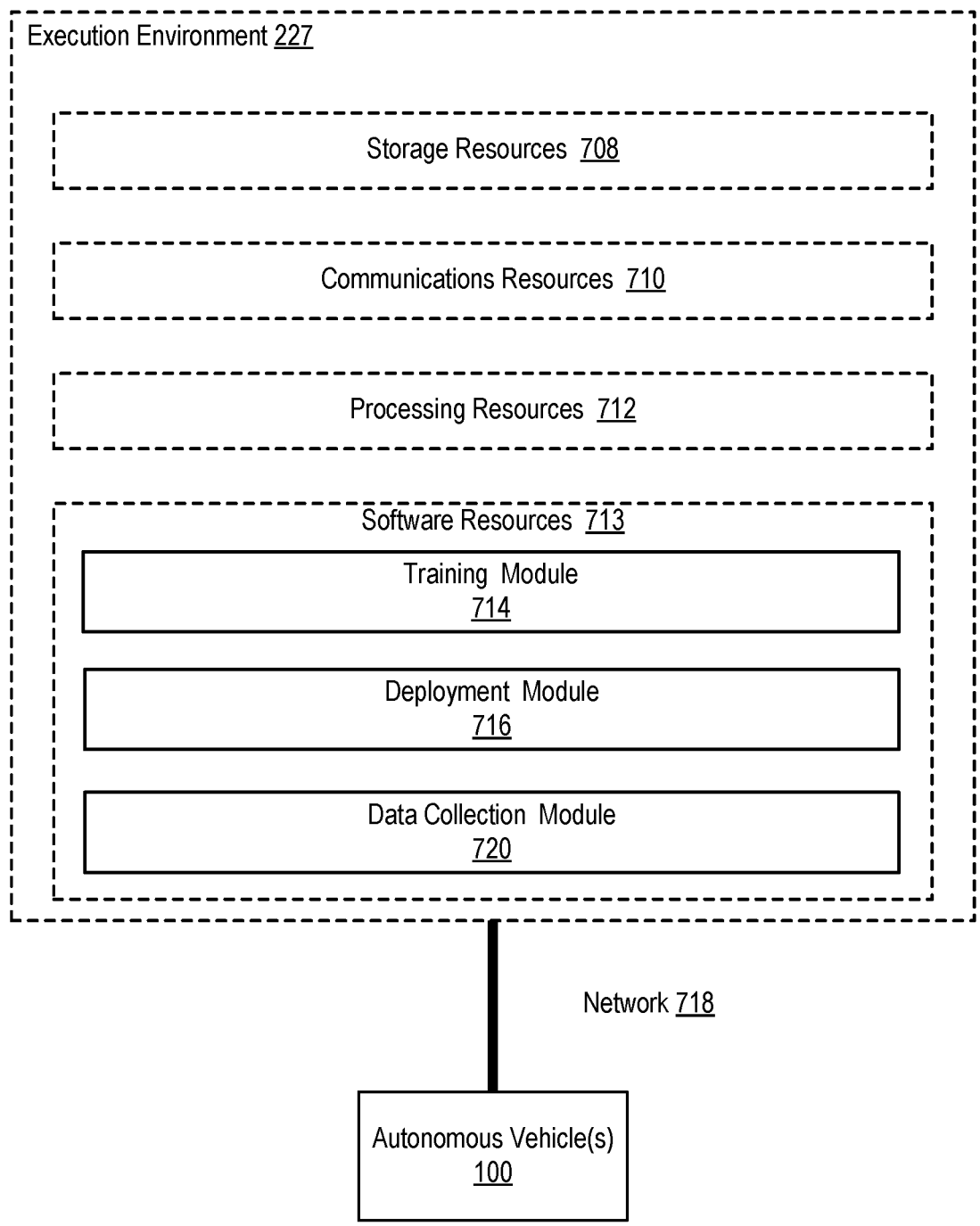
FIG. 7 is an example view of an execution environment for velocity adjustments based on roadway scene comprehension according to some embodiments.

For further explanation, FIG. 7 sets forth a diagram of an execution environment 227 in accordance with some embodiments of the present disclosure. The execution environment 227 depicted in FIG. 7 may be embodied in a variety of different ways. The execution environment 227 may be provided, for example, by one or more physical or virtual machine components consisting of bare-metal applications, operating systems such as Android, Linux, Real-time Operating systems (RTOS), Automotive RTOS, such as AutoSAR, and others, including combinations thereof. The execution environment 227 may also be provided by cloud computing providers such as Amazon AWS™, Microsoft Azure™, Google Cloud™, and others, including combinations thereof. Alternatively, the execution environment 227 may be embodied as a collection of devices (e.g., servers, storage devices, networking devices) and software resources that are included in a computer or distributed computer or private data center. The execution environment 227 may be constructed in a variety of other ways and may even include resources within one or more autonomous vehicles or resources that communicate with one or more autonomous vehicles.

The execution environment 227 depicted in FIG. 7 may include storage resources 708, which may be embodied in many forms. For example, the storage resources 708 may include flash memory, hard disk drives, nano-RAM, 3D crosspoint non-volatile memory, MRAM, non-volatile phase-change memory (PCM), storage class memory (SCM), or many others, including combinations of the storage technologies described above. Other forms of computer memories and storage devices may be utilized as part of the execution environment 227, including DRAM, SRAM, EEPROM, universal memory, and many others. The storage resources 708 may also be embodied, in embodiments where the execution environment 227 includes resources offered by a cloud provider, as cloud storage resources such as Amazon Elastic Block Storage (EBS) block storage, Amazon S3 object storage, Amazon Elastic File System (EFS) file storage, Azure Blob Storage, and many others. The example execution environment 227 depicted in FIG. 7 may implement a variety of storage architectures, such as block storage where data is stored in blocks, and each block essentially acts as an individual hard drive, object storage where data is managed as objects, or file storage in which data is stored in a hierarchical structure. Such data may be saved in files and folders and presented to both the system storing it and the system retrieving it in the same format.

The execution environment 227 depicted in FIG. 7 also includes communications resources 710 that may be useful in facilitating data communications between components within the execution environment 227, as well as data communications between the execution environment 227 and computing devices that are outside of the execution environment 227. Such communications resources may be embodied, for example, as one or more routers, network switches, communications adapters, and many others, including combinations of such devices. The communications resources 710 may be configured to utilize a variety of different protocols and data communication fabrics to facilitate data communications. For example, the communications resources 710 may utilize Internet Protocol ('IP') based technologies, fibre channel (FC) technologies, FC over ethernet (FCoE) technologies, InfiniBand (IB) technologies, NVM Express (NVMe) technologies and NVMe over fabrics (NVMeoF) technologies, and many others. The communications resources 710 may also be embodied, in embodiments where the execution environment 227 includes resources offered by a cloud provider, as networking tools and resources that enable secure connections to the cloud as well as tools and resources (e.g., network interfaces, routing tables, gateways) to configure networking resources in a virtual private cloud. Such communications resources may be useful in facilitating data communications between components within the execution environment 227, as well as data communications between the execution environment 227 and computing devices that are outside of the execution environment 227 (e.g., computing devices that are included within an autonomous vehicle 100).

The execution environment 227 depicted in FIG. 7 also includes processing resources 712 that may be useful in useful in executing computer program instructions and performing other computational tasks within the execution environment 227. The processing resources 712 may include one or more application-specific integrated circuits (ASICs) that are customized for some particular purpose, one or more central processing units (CPUs), one or more digital signal processors (DSPs), one or more field-programmable gate arrays (FPGAs), one or more systems on a chip (SoCs), or other form of processing resources 712. The processing resources 712 may also be embodied, in embodiments where the execution environment 227 includes resources offered by a cloud provider, as cloud computing resources such as one or more Amazon Elastic Compute Cloud (EC2) instances, event-driven compute resources such as AWS Lambdas, Azure Virtual Machines, or many others.

The execution environment 227 depicted in FIG. 7 also includes software resources 713 that, when executed by processing resources 712 within the execution environment 227, may perform various tasks. The software resources 713 may include, for example, one or more modules of computer program instructions that when executed by processing resources 712 within the execution environment 227 are useful in training neural networks configured to determine control autonomous vehicle control operations. For example, a training module 714 may train a neural network using training data including sensor 212 data and control operations recorded or captured contemporaneous to the training data. In other words, the neural network may be trained to encode a relationship between an environment relative to an autonomous vehicle 100 as indicated in sensor 212 data and the corresponding control operations effected by a user or operation of the autonomous vehicle. The training module 714 may provide a corpus of training data, or a selected subset of training data, to train the neural network. For example, the training module 714 may select particular subsets of training data associated with particular driving conditions, environment states, etc. to train the neural network.

The software resources 713 may include, for example, one or more modules of computer program instructions that when executed by processing resources 712 within the execution environment 227 are useful in deploying software resources or other data to autonomous vehicles 100 via a network 718. For example, a deployment module 716 may provide software updates, neural network updates, or other data to autonomous vehicles 100 to facilitate autonomous vehicle control operations.

The software resources 713 may include, for example, one or more modules of computer program instructions that when executed by processing resources 712 within the execution environment 227 are useful in collecting data from autonomous vehicles 100 via a network 718. For example, a data collection module 720 may receive, from autonomous vehicles 100, collected sensor 212, associated control operations, software performance logs, or other data. Such data may facilitate training of neural networks via the training module 714 or stored using storage resources 708.

In accordance with embodiments, the autonomous vehicle 100 may be configured with a dynamic velocity adjustment system to perform velocity adjustments based on roadway comprehension. When a vehicle is operated autonomously, it is important to consider safety in view of the surrounding traffic conditions as well as the comfort of the driver and passengers in the vehicle. Factors influencing this safety and comfort may include the velocity of the autonomous vehicle relative to other vehicles on the roadway, the distance maintained between the autonomous vehicle and another vehicle in the driving lane, the size of vehicles surrounding the autonomous vehicle (e.g., trucks, SUVs), the density of traffic on the roadway, rates and acceleration and deceleration, roadway conditions, and so on. To make driving decisions geared toward maximizing safety and minimizing driver and passenger discomfort, the dynamic velocity adjustment system uses sensor data to understand the speed or density of traffic on the roadway and make velocity adjustment decisions based on that understanding. In some examples, radar data from radar sensors (e.g., radar sensor 118, radar sensor 120) is utilized, alone or in conjunction with data from other sensors, to comprehend a roadway scene including the velocity of other vehicles on the roadway, the distance of those vehicles from the autonomous vehicle, the density of traffic on the roadway, or a combination of any of these. The use of radar data is advantageous over other sensor data (e.g., camera data) because a radar sensor can provide a near-instantaneous measurement of the velocity of another vehicle. That is, two radar samples separated by a small amount of time (on the order of milliseconds) can provide a near-instantaneous measurement to approximate instantaneous velocity (i.e., a velocity at a particular instant). Furthermore, the use of radar data is advantageous in that radar can detect objects (i.e., vehicles) that would be obscured if using, for example, visual data. For example, when traveling behind a vehicle it may be difficult to visually observe other vehicles in front of that vehicle. However, radar transmissions and radar returns can travel under vehicles, where a first vehicle may act as a waveguide to facilitate detection of a second vehicle in front of the first vehicle.

In some embodiments, an automation module includes a dynamic velocity adjustment system module. In some examples, radar data for the roadway are collected by radar sensors of the autonomous vehicle. Based on the radar data, particular radar observations exhibiting a radar signature for a vehicle are classified as vehicles and a velocity and distance relative to the autonomous vehicle are recorded for each detected vehicle. The detected vehicles, their velocities, and their distances from the autonomous vehicle represent a roadway scene. The roadway scene may also include placements of any of the detected vehicles in lanes within and outside of the autonomous vehicle's lane of travel. In particular, the autonomous vehicle may, using data from forward facing radar sensors, identify the velocity and distance of the vehicle immediately in front of the autonomous vehicle in the autonomous vehicle's driving lane. These measurements can be used for velocity adjustments to maintain a safe following distance and to influence acceleration or deceleration rates. Similarly, in some examples, the autonomous vehicle, using data from rear facing radar sensors, identifies the approximated instantaneous velocity and distance of the vehicle following the autonomous vehicle in the autonomous vehicle's driving lane. These measurements can be used to influence the velocity of the autonomous vehicle, particularly when a rear vehicle is 'tailgating.'

In some examples, where the roadway is a multilane roadway, each detected vehicle may be correlated to a driving lane of the roadway scene. The driving lanes may be determined through a variety of techniques, including detecting driving lanes from camera data, detecting driving lanes based on map data, and detecting driving lanes based on the orientation of radar-detected vehicles relative to the autonomous vehicle and using a standard lane width. For example, the position of the radar-detected vehicle (e.g., based on angle and distance relative to the autonomous vehicle) may be correlated to a camera-detected driving lane or to a camera-detected vehicle in a driving lane. Although the use of image data from camera sensors is useful in detecting driving lanes, a vehicle can be correlated to a driving lane based on radar data alone. In some examples, correlating detected vehicles to driving lanes may be omitted so long as the radar data is used to distinguish the vehicle immediately in front of the autonomous vehicle from other vehicles.

In some examples, an ambient velocity of the roadway is derived from the radar-detected velocities of other vehicles in the roadway scene. This ambient velocity represents how fast other vehicles are traveling on the roadway, both in the autonomous vehicle's lane and in other lanes. For example, to calculate the ambient velocity of the roadway, the detected velocity of each vehicle may be weighted based on its distance from the autonomous vehicle. In one example, velocities of vehicles that are within a particular range are weighted more than velocities of vehicles outside of that range. To aid illustration, in a particular example the velocities of vehicles that are 20 meters to 60 meters ahead of autonomous vehicle are weighted more than the velocities of vehicles that are outside of that range. In this way, the autonomous vehicle may adjust its velocity based on traffic that is ahead of it (in the same lane or different lanes), where drivers may have already reacted to roadway conditions. The weighted velocities are then averaged to arrive at the ambient velocity. Thus, when the ambient velocity is used to make velocity adjustments in the autonomous vehicle, the velocities of vehicles traveling closest to the autonomous vehicle will contribute more to the adjustments. As one example, to optimize driver comfort, the autonomous vehicle may decrease its velocity when it is detected that the ambient velocity is slower than that of the autonomous vehicle's current velocity. Similarly, the autonomous vehicle may increase its velocity when it is detected that the ambient velocity is faster than that of the autonomous vehicle's current velocity. The ambient velocity of the roadway may be determined based on the traffic on the roadway as a whole or on a per-lane basis.

In some examples, to optimize safety and driver, the dynamic velocity adjustment system derives a traffic density parameter from the positions of radar-detected vehicles in the roadway scene. For example, using radar data, the autonomous vehicle may rate the traffic density based on the number of detected vehicles, the distance of the detected vehicles from the autonomous vehicle, and the distances of the detected vehicles from one another. In one example, these values may be applied to a function that characterizes traffic density. In another example, these values may be applied to a neural network trained to classify the traffic density. The traffic density parameter may be used in making decisions on acceleration or deceleration rates, as well as how much forward distance to maintain with respect to another vehicle in the autonomous vehicle's driving lane. For example, given high traffic density, a slower acceleration pattern may be employed, whereas a higher acceleration pattern may be employed in low density traffic. As another example, given high traffic density, the forward distance to another vehicle in the autonomous vehicle's driving lane may be increased to allow for more reaction time.

In some examples, to optimize safety and driver comfort, the dynamic velocity adjustment system determines an optimal forward distance with respect to the vehicle ahead of the autonomous vehicle in the autonomous vehicle's driving lane. For example, an optimal forward distance parameter may be derived from the current velocity of the autonomous vehicle and the radar-detected traffic density, as well as other factors. In one example, the current velocity of the autonomous vehicle and a traffic density rating are applied to look-up tables or a function that expresses a predetermined forward distance that should be maintained based on those factors. For example, the minimum forward distance might be increased as the velocity of the autonomous vehicle increases, thus allowing more reaction time. In high density traffic, the minimum forward distance might be increased even more to compensate for the unpredictability of other drivers, whereas in low density traffic the forward distance might be lower. The autonomous vehicle then makes velocity adjustments to maintain the optimal forward distance.

The optimal forward distance may be further modified by other factors, such as the ambient velocity of the roadway scene. For example, the forward distance might be increased as the ambient velocity of the roadway scene increases, thus allowing more reaction time (e.g., where other vehicles are traveling faster than the posted speed limit). The optimal forward distance might be further increased in the case of poor road conditions (e.g., wet or icy roads). For example, where there is a high traffic density rating and/or a high ambient velocity of the surrounding vehicles, and the road conditions are wet or icy, the forward distance may be increased beyond a normal forward distance to allow for greater reaction time.

In some examples, to optimize safety and driver comfort, the dynamic velocity adjustment system performs velocity adjustments using acceleration or deceleration patterns that are based on a comprehension of the roadway scene. Different acceleration or deceleration patterns may be employed based on a traffic density rating, where the traffic density rating is based on the radar-detected vehicles in the roadway scene as discussed above. For example, in high density traffic, the autonomous vehicle may be programmed to accelerate at a slower rate compared to a rate utilized in low density traffic. This behavior allows for greater reaction time in response to the unpredictability of the dense traffic and mitigates against repeated acceleration and deceleration.

In some examples, to optimize safety and driver comfort, the dynamic velocity adjustment system classifies the radar-detected vehicles according to vehicle type. Radar signatures of the radar-detected vehicles may be utilized to classify that vehicle as a car, motorcycle, freight truck, bus, and so on. For example, a micro-Doppler effect caused by motorcycle wheels may indicate a motorcycle, whereas repeated detections of the same radar signature may indicate a long vehicle such as a tractor-trailer or bus. These vehicle classifications can influence the velocity adjustments that are made to enhance driver comfort. For example, the autonomous vehicle may be programmed to decelerate when being passed by a large freight truck or bus, as a driver may not feel comfortable traveling next to such a large vehicle. Conversely, the autonomous vehicle may be programmed to accelerate faster when passing nearly or immediately adjacent to a large freight truck or bus. These behaviors minimize the amount of time that the autonomous vehicle is traveling next to the truck or bus. As another example, a vehicle that is classified as a motorcycle may be weighted less when determining an ambient velocity of the road scene, as motorcyclists tend to drive differently compared to drivers of other types of vehicles.

In some examples, the contribution of a radar-detected object to the roadway scene comprehension is weighted in accordance with a confidence level. The confidence level can be based on factors such as signal-to-noise ratio (SNR), the angle of detection, a mapping of the detected radar return to known radar signatures, a large divergence of one radar measurement from other radar measurements, and so on. For example, there is a low confidence in a radar object where it is difficult to determine whether two radar returns correspond to the same object, one object may be weighted less or omitted entirely when determining a traffic density rating or an ambient velocity of the roadway scene. In another example, where the approximated instantaneous velocity of a radar object is much faster or much slower than surrounding objects, the confidence level in that measurement may be low and thus weighted less or omitted from an ambient velocity determination. In yet another example, an approximated instantaneous velocity measurement of a vehicle having a low SNR may be weighted less than the approximated instantaneous velocity measurements of other vehicles when determining an aggregate velocity of the roadway scene.

In some examples, to increase the level of comprehension of the roadway scene, radar data from the radar sensors may be combined with other sensor data from other sensors, such as cameras, laser imaging, detection, and ranging (LiDAR) sensors, and so on. For example, vehicles detected via radar data may be correlated to vehicles detected via camera data based on positioning relative to the autonomous vehicle; driving lanes detected via radar data may be correlated to driving lanes detected via camera data; traffic density detected via radar data can be compared to traffic density detected via camera data; and so on. Further, in addition to forward radar, the autonomous vehicle may gather radar data from the rear of the vehicle using a rear-facing radar sensors and radar data from the side of the vehicle using side-facing radar sensors. The radar data may be used to generate a 360-degree comprehension of the roadway. Further, data from the vehicle control system may be used to determine road conditions (e.g., based on the activity of the windshield wipers or tire slip measurements). Further, the radar data may be correlated to map data obtained from a map data server via a wireless communications channel.

In some examples, to optimize safety and driver, the dynamic velocity adjustment system emulates the driving behavior of the driver based on historical data gathered when the autonomous vehicle is operated by the driver. For example, while the vehicle is under the manual operation of the driver, data for a roadway scene is collected to identify the aggregate velocity of the roadway, the traffic density, and the forward distance between the autonomous vehicle and the vehicle in front of the autonomous vehicle in its driving lane. Over the same time, the velocity of the autonomous vehicle is recorded and, in some examples, the acceleration and deceleration patterns as provided by the driver. In some examples, this data is used to train a machine learning model (e.g., a neural network) that, given parameters such as the ambient velocity and traffic density of the roadway scene, will output a velocity and forward distance for the autonomous vehicle that emulates the driver's behavior in the same conditions. During autonomous driving, the driver's comfort is enhanced through emulation of the driver's behavior. For example, the driver's comfort may include the driver's preferences for distance to vehicles in the lane of travel, velocity patterns used to close a gap with a vehicle in front, tolerance for differences in velocity between the driver and other vehicles, and other factors. The training data may be transmitted by the autonomous vehicle to processing resources of a remote execution environment that generates a model for the driver. In some examples, the model is stored on the autonomous vehicle and used to make velocity adjustments in accordance with historical driver behavior.

Figure 8:
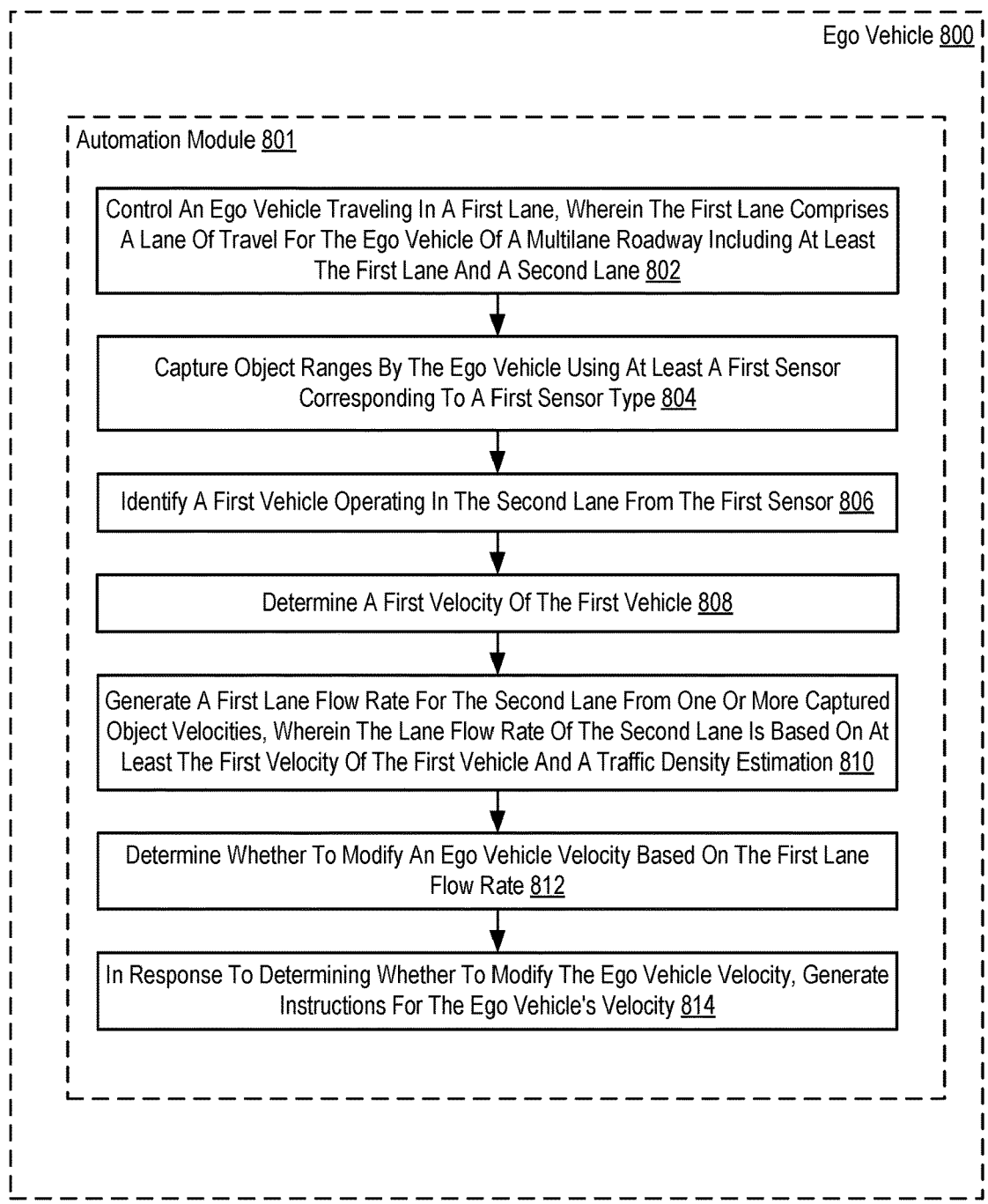
FIG. 8 is a flowchart setting forth an example method of velocity adjustments based on roadway scene comprehension according to some embodiments.

For further explanation, FIG. 8 sets forth a flowchart illustrating an exemplary method for a dynamic velocity adjustment system in accordance with some embodiments. The method of FIG. 8 may be performed, for example, in an autonomous vehicle such as an autonomous vehicle 100. Accordingly, in such embodiments, the method of FIG. 8 may be performed at least in part using an automation computing system 116 or other computing components of the autonomous vehicle 100. In some embodiments, the method of FIG. 8 may be performed in a non-autonomous vehicle (e.g., a vehicle lacking full autonomous driving functionality) having suitable cameras or other sensors facilitating the operations described herein.

The method of FIG. 8 includes controlling 802 an ego vehicle 800 traveling in a first lane, wherein the first lane comprises a lane of travel for the ego vehicle 800 of a multilane roadway including at least the first lane and a second lane. The ego vehicle 800 is a vehicle that includes sensors and processing elements to perceive and comprehend the environment around the vehicle. The ego vehicle 800 may be a vehicle configured for autonomous driving, such as the autonomous vehicle 100 described above. In some examples, an automation module 801 (e.g., the automation module 220 of FIG. 2) controls the ego vehicle 800 by processing sensor data from various sensors to making a driving decision for the ego vehicle based on the sensor data. The driving decision comprises one or more operational commands for an ego vehicle 800 to affect the movement, direction, or other function of the ego vehicle 800, thereby facilitating autonomous driving or operation of the vehicle. Such operational commands may include a change in the speed of the ego vehicle 800, a change in steering direction, a change in gear, or other commands. For example, the automation module 801 may provide sensor data and/or processed sensor data as one or more inputs to a function, characteristic equation, mapping table, or trained machine learning model (e.g., a trained neural network) to determine the one or more operational commands. The operational commands may then be communicated to autonomous vehicle control systems via a vehicle interface.

In a particular embodiment, the automation module 801 is configured to make driving decisions that include velocity adjustments based on a comprehension of the multilane roadway, where the ego vehicle 800 travels in a first lane and other vehicles may also travel in the first lane as well as one or more second lanes of the multilane roadway. As such, in some examples, the automation module 801 is configured to detect driving lanes based on sensor data captured by the ego vehicle 800. For example, to detect the driving lanes, the automation module 801 may use camera data, radar data, map data, data from other sensors, and combinations thereof.

The method of FIG. 8 also includes capturing 804 object ranges by the ego vehicle 800 using at least a first sensor corresponding to a first sensor type. The ego vehicle 800 may include a variety of types of sensors operating on a variety of spectral realms. For example, the ego vehicle 800 may include camera sensors that collect visual spectrum data, radar sensors that collect radar return data, infrared sensors that collect infrared spectrum data, LiDAR sensors, and so on. In some examples, the automation module 801 captures 804 object ranges using at least a first sensor by collecting measurements based on radar data and detecting objects based on those measurements. The automation module 801 then identifies the range of each detected object in the frame by determining the position of the object on the roadway relative to the ego vehicle 800. In a particular example, the automation module 801 captures 804 object ranges using at least a first sensor by capturing object ranges from radar data collected by a radar sensor.

In some examples, the first sensor is used to collect observations of the roadway in the form of sensor data. For example, the sensor data may be radar data from a radar sensor, where an observation includes radar return samples of a radar detected object in a particular sampling interval. In another example, the sensor data may be visual data from a camera, where an observation identifies an object in one frame of visual data captured by the camera. The automation module 801 clusters the observations to determine a coherent object and, when the coherent object matches the signature of a vehicle, classifies the coherent object as a vehicle. For example, the automation module 801 may cluster radar return samples to identify a coherent radar object and compares the radar return signal to a known radar signature for a vehicle. The cluster of radar return samples may include a time series of radar return samples over a predetermined time period that are filtered and smoothed to identify a coherent object. The automation module 801 further determines an object range of the vehicle indicating the distance and position of the vehicle. For example, where a radar sensor is used to collect the observations, the radar data may indicate a distance of the first vehicle from the ego vehicle and an angle of the first vehicle relative to the ego vehicle. The automation module 801 then determines the traveling lane of the first vehicle based on the position of the second first of relative to the ego vehicle and the detected lanes of the roadway. For example, radar data indicating the position of the first vehicle relative to the ego vehicle may be correlated to a lane detected via various lane detection techniques (e.g., visual lane detection) as discussed above.

In a particular example, radar data is used to generate near-instantaneous measurements. A radar sensor of the ego vehicle transmits a radar signal and receives one or more radar return signals from one or more objects on or adjacent to the roadway. The objects may be stationary objects (e.g., trees, road signs, stopped vehicles) or moving objects (e.g., moving vehicles). The radar return signal of a particular object may include multiple radar reflections that are generated by the object. In some examples, the automation module 801 clusters the multiple reflections to identify a radar return signal that corresponds to that object. The frequency and/or phase of the radar return signal for an object is measured over a coherent processing interval in which the transmitted radar signal is pulsed, and the radar return signal is received from the environment that includes the object. Thus, in some examples, the automation module 801 of the ego vehicle 800 collects radar measurements for one or more radar-detected objects during at least one coherent processing interval. The time period of the coherent processing interval may be relatively short (on the order of milliseconds) such that an instantaneous measurement of the object can be approximated using a single radar measurement.

In some examples, the automation module 801 constructs objects from discrete radar measurements using knowledge of the scene objects (e.g., based on other sensor data) to group radar detections as a single object. The grouping of multiple radar observations prevents any measure of velocity or distance from being overweighted by objects that may have more radar returns than other objects. Alternatively, the automation module 801 does not use a priori knowledge of the scene and instead uses traditional clustering algorithms to form objects to establish object speed and object distance within a scene. However, an object detection in one time period is not guaranteed to be present in the next set of measurement samples. In some examples, to stabilize the measurement of object properties, the automation module 801 uses multiple temporal samples to filter and smooth the measurement, thus preventing discontinuities in measurements in successive time intervals. This can avoid, for example, abrupt adjustments to the ego vehicle's velocity in response to transitory changes in sensor readings.

The method of FIG. 8 also includes identifying 806 as a first vehicle operating in the second lane using the first sensor. In some examples, the automation module 801 identifies 806 a first vehicle operating in the second lane from the first sensor by classifying a detected object as a vehicle based on sensor data signature for vehicles. For example, the automation module 801 may use pattern matching of visual data from a camera or a radar return signature based on radar data collected by a radar sensor. The automation module 801 also determines the lane of travel of the first vehicle based on, for example, radar data indicating the position of the detected vehicle relative to the ego vehicle 800 (e.g., based on the object range and an angle of detection of a returned radar signal) and the orientation of lanes around the ego vehicle identified using the lane detection described above. For example, a small angle of return would indicate that the vehicle is in the same lane, while a larger angle of return would indicate the object is in another lane. In such an example, the automation module 801 may determine the lane of travel of the first vehicle based on radar data alone. In another example, the automation module 801 can determine that the first vehicle is in a particular lane of the roadway based on visual data from a camera, or based on a combination of radar data and visual data.

The method of FIG. 8 also includes determining 808 a first velocity of the first vehicle. In some examples, the automation module 801 determines the first velocity of the first vehicle based on radar data from a radar sensor. The use of radar provides the advantage of determining an approximated instantaneous velocity of an object. When a radar signal hits an object such as the first vehicle, the difference in frequency of the returned radar signal caused by the Doppler effect is proportional to the velocity of that object. This returned radar signal from the first vehicle can be compared to the returned radar signal of stationary objects in the roadway scene to determine the velocity of the first vehicle, or the velocity of the first vehicle based on the returned radar signal can be determined relative to the velocity of the ego vehicle. The velocity of an object can be determined based on a few samples of the radar signal over a short time period (on the order of milliseconds), thus allowing for an approximation of the instantaneous velocity of the first vehicle. As such, in these examples, the first velocity is the approximated instantaneous velocity of the first vehicle. In other examples, other types of sensor data may be used to determine 808 the first velocity of the first vehicle. For example, visual data from a camera or LiDAR data from a LiDAR sensor can be used to determine the first velocity of the first vehicle by capturing the object in multiple frames or using multiple samples and computing a velocity based on these multiple detections. As another example, visual data from cameras (e.g., cameras in a stereoscopic mode) can be used to determine velocity of the first vehicle, either alone or in combination with other sensor data such as radar data.

The method of FIG. 8 also includes generating 810 a first lane flow rate for the second lane from one or more captured object velocities, wherein the lane flow rate of the second lane is based on at least the first velocity of the first vehicle and a traffic density estimation. The one or more captured object velocities includes the detected velocity of the first vehicle and may include the detected velocities of other vehicles traveling in the second lane. The lane flow rate may be derived from the aggregate of these velocities and, in some examples, the traffic density of the lane. In some examples, the automation module 801 determines first lane flow rate using the first velocity of the first vehicle as an estimation of the speed of traffic traveling in the second lane. For example, if the first vehicle is traveling at a rate of 20 meters per second, the automation module 801 may determine that all nearby vehicles traveling in the second lane are traveling at generally the same velocity. In some examples, the first lane flow rate is based on two or more vehicles traveling in the second lane. For example, the automation module 801 can identify a group of vehicles that are traveling in the second lane and average the velocities of each vehicle to generate the flow rate of traffic in the second lane. In some examples, generating the first lane flow rate includes determining the traffic density rating of the second lane. For example, the automation module 801 may determine the number of detected vehicles traveling in the second lane and/or the size of the detected vehicles traveling in the second lane and generate a lane flow rate that is a function of detected vehicle velocities and density of traffic in the second lane.

In some examples, the velocities can be weighted in accordance with the distance of the vehicle from the ego vehicle 800. For example, the velocity of each detected vehicle can be weighted in accordance with its distance from the ego vehicle 800, such that the weight attributed to a vehicle velocity is based on that vehicle's distance from the ego vehicle (e.g., the velocities of vehicles within a particular range are weighted more). The weighted velocities can then be averaged to estimate the flow rate of traffic in the second lane. In other examples, the lane flow rate is determined based on an average of velocities of vehicles that are within a threshold distance of the ego vehicle 800 in the second lane. As will be explained in more detail below, the first lane flow rate may be used to adjust the velocity of the ego vehicle. As such, to optimize safety and driver/passenger comfort, it is advantageous to establish the first lane flow rate based on vehicles in proximity to the ego vehicle 800.

The method of FIG. 8 also includes determining 812 whether to modify an ego vehicle velocity based on the first lane flow rate. In some examples, the automation module 801 determines whether to modify the velocity of the ego vehicle 800 by comparing the current ego vehicle velocity to the lane flow rate velocity of the second lane and adjusting the ego vehicle's velocity accordingly. For example, if the ego vehicle is traveling slower that the velocity of the lane flow rate of the second lane, the automation module 801 may determine to increase the ego vehicle's velocity. By contrast, if the ego vehicle is traveling faster that the velocity of the lane flow rate of the second lane, the automation module 801 may determine to decrease the ego vehicle's velocity. Thus, within other speed constraints (e.g., posted speed limit or predetermined safe speed), the velocity of the ego vehicle can be adjusted to match the lane flow rate velocity of the second lane. However, if the traffic density component of the lane flow rate of the second lane is high, thus signaling traffic congestion, the automation module 801 may determine to decrease the ego vehicle's velocity. Thus, even if the velocity of the lane flow rate of the second lane is faster than the ego vehicle's velocity, the automation module 801 may determine to decrease the ego vehicle's velocity in view of the density of vehicles in the second lane. Accordingly, the automation module 801 determines, based on the current ego vehicle velocity and the first lane flow rate, whether the current ego vehicle velocity should be adjusted and by what degree.

The method of FIG. 8 also includes in response to determining 812 whether to modify the ego vehicle's velocity, generating 814 instructions for the ego vehicle's velocity. In some examples, the automation module 801 generates instructions for the ego vehicle's velocity by providing operational commands to adjust the ego vehicle's velocity to an autonomous vehicle control systems (e.g., the autonomous vehicle control systems 223 of FIG. 2) via a vehicle interface. For example, the operational commands may indicate a target velocity to which the ego vehicle's velocity should be adjusted. The target velocity may be the lane flow rate velocity of the second lane or the lane flow rate velocity of the second lane offset (e.g., reduce speed slower by a predetermined amount (e.g., 3 meters/second, 4 meters/second, 5 meters/second), reduce speed by a percentage (e.g., 1 percent, 2 percent, 3, percent, 4 percent, 5 percent) from the lane flow rate velocity or ego vehicle velocity).

Thus, by knowing the speed of the ego vehicle and the estimated speed of the ego vehicle's lane and the lanes near the ego vehicle lane, the automation module 801 can determine what the speed of the vehicle should be given the speed of the traffic around it. This will prevent the ego vehicle 800 from traveling too fast or too slow for the relative speed of the surrounding traffic. The automation module 801 can also use the speed limit to provide maximum limits for vehicle speed in traffic. This eliminates the need of a user to set a specific cruise speed. The speed of the vehicle will be determined by the speed limit and the safe speed given the flow of traffic in the scene.

Figure 9:
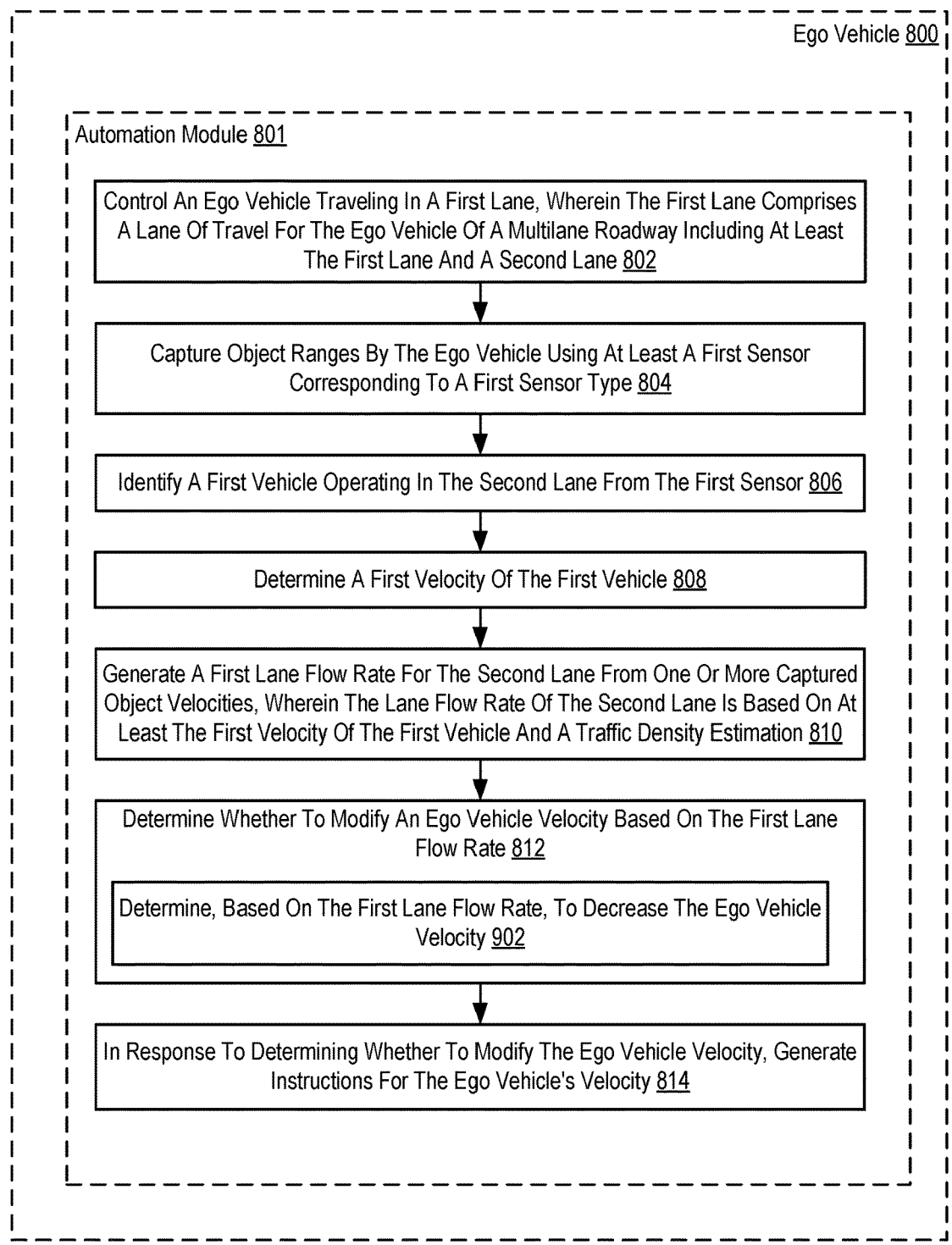
FIG. 9 is a flowchart setting forth another example method of velocity adjustments based on roadway scene comprehension according to some embodiments.

For further explanation, FIG. 9 sets forth a flowchart illustrating an exemplary method for a dynamic velocity adjustment system in accordance with some embodiments. The method of FIG. 9 is similar to the method of FIG. 8 in that the method of FIG. 9 may include many of the same elements. In the method of FIG. 9, determining 812 whether to modify an ego vehicle velocity based on the first lane flow rate includes determining 902, based on the roadway velocity scene, to decrease the ego vehicle velocity. For example, occupants of the vehicle may perceive that, even if the lane of travel is empty, other vehicles in lanes pose a cut-in risk so the ego vehicle's speed should be reduced to allow for additional reaction time. As discussed above, the automation module 801 can determine to decrease the ego vehicle's velocity in response to determining that the velocity component of the first lane flow rate is slower than the ego vehicle's current velocity. In response to determining to decrease the ego vehicle's velocity, the automation module 801 generates instructions to decrease the ego vehicle's velocity and transmits those instructions to, for example, an autonomous vehicle control system as discussed above. In some cases, decreasing the ego vehicle's velocity based on the first lane flow rate provides a precautionary measure. For example, drivers of other vehicles may be aware of a traffic accident, road construction, roadway obstacle (e.g., a pothole or debris), or other conditions that warrant a velocity reduction. In some cases, decreasing the ego vehicle's velocity based on the first lane flow rate optimizes driver comfort. For example, driving faster than other vehicles on the roadway, and in particular driving faster than vehicles traveling in a passing lane, may cause anxiety in the driver or other passengers in the ego vehicle. When the density component of the first lane flow rate is high, suggesting traffic congestion or dense traffic, driver comfort can be enhanced by decreasing the ego vehicle's velocity. As such, the automation module 801 may decrease the ego vehicle's velocity in accordance with the first lane flow rate and/or the lane flow rates of additional lanes thus making the driver feel more comfortable.

Figure 10:
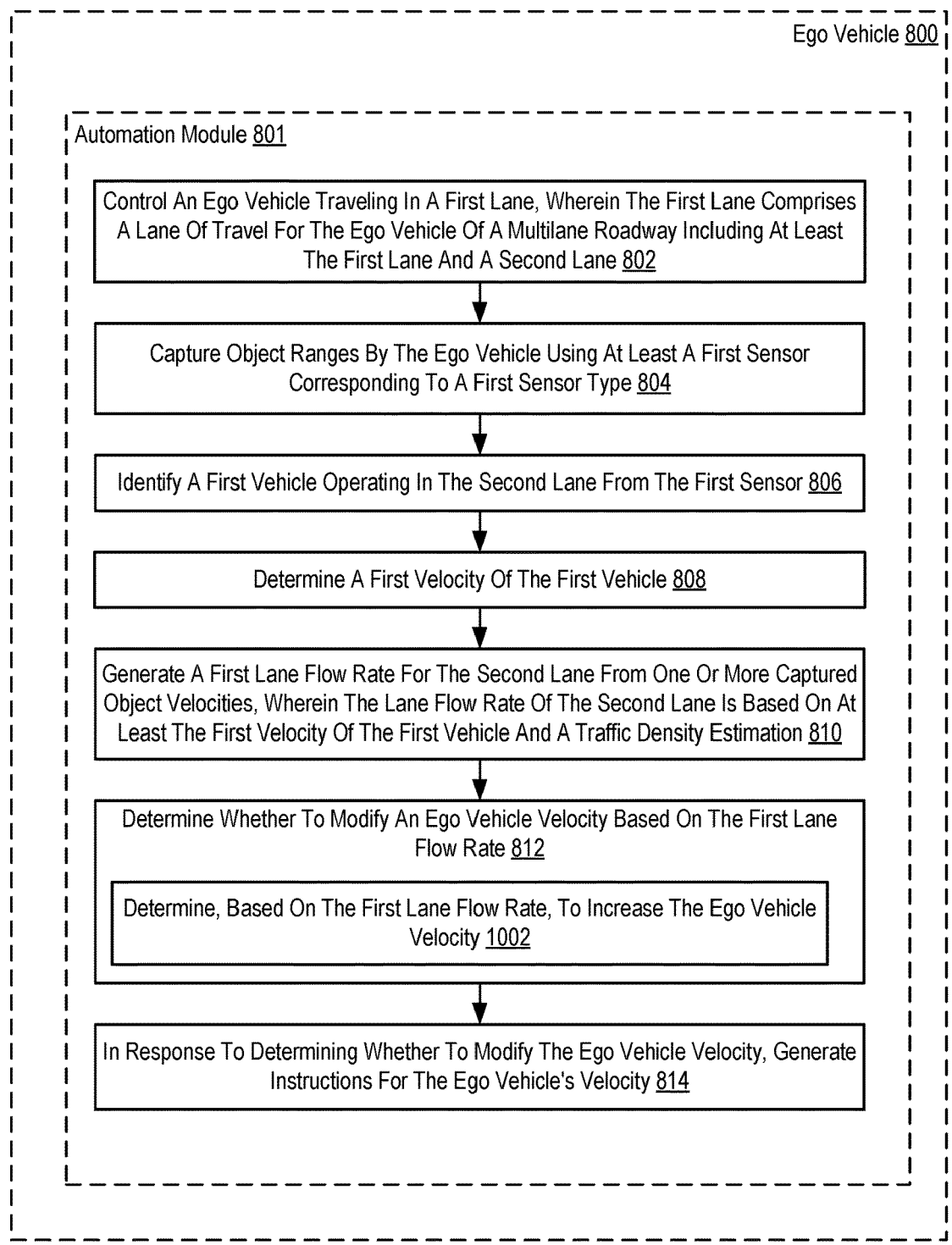
FIG. 10 is a flowchart setting forth another example method of velocity adjustments based on roadway scene comprehension according to some embodiments.

For further explanation, FIG. 10 sets forth a flowchart illustrating an exemplary method for a dynamic velocity adjustment system in accordance with some embodiments. The method of FIG. 10 is similar to the method of FIG. 8 in that the method of FIG. 10 may include many of the same elements. In the method of FIG. 10, determining 812 whether to modify an ego vehicle velocity based on the first lane flow rate includes determining 1002, based on the roadway velocity scene, to increase the ego vehicle velocity. As discussed above, the automation module 801 can determine to increase the ego vehicle's velocity in response to determining that the velocity component of the first lane flow rate is faster than the ego vehicle's current velocity. In response to determining to increase the ego vehicle's velocity, the automation module 801 generates instructions to increase the ego vehicle's velocity and transmits those instructions to, for example, an autonomous vehicle control system as discussed above. In some cases, the ego vehicle's velocity may be increased based on the first lane flow rate as a precautionary measure. For example, it may be dangerous to travel slower than the surrounding vehicles on the roadway. In some cases, the ego vehicle's velocity may be increased based on the first lane flow rate to optimize driver comfort. For example, driving slower than the vehicles traveling in the lane to the immediate right of the ego vehicle's lane (i.e., being passed on the right) may cause anxiety in the driver or other passengers in the ego vehicle. When the density component of the first lane flow rate is low, suggesting sparse traffic on the roadway, driver comfort and time efficiency can be enhanced by increasing the ego vehicle's velocity. However, the ego vehicle's velocity is constrained by the posted speed limit or a predetermined maximum safe speed (e.g., based on historical traffic patterns) and, where appropriate, the minimum forward distance to the vehicle in front of the ego vehicle in the ego vehicle's driving lane. As such, the automation module 801 may increase the ego vehicle's velocity in accordance with the first lane flow rate and/or the lane flow rates of additional lanes thus making the driver feel more comfortable.

Figure 11:
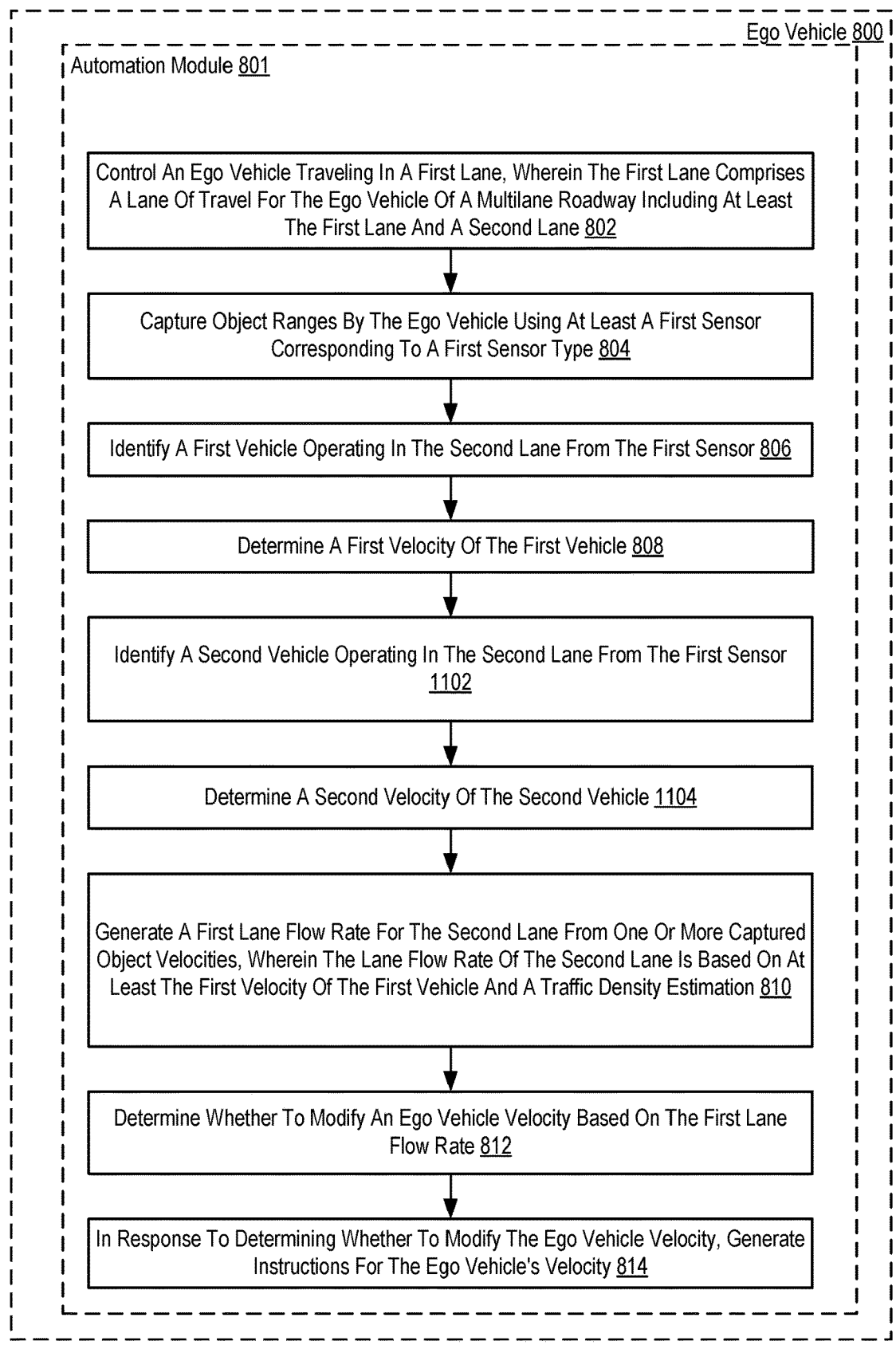
FIG. 11 is a flowchart setting forth another example method of velocity adjustments based on roadway scene comprehension according to some embodiments.

For further explanation, FIG. 11 sets forth a flowchart illustrating an exemplary method for a dynamic velocity adjustment system in accordance with some embodiments. The method of FIG. 11 is similar to the method of FIG. 8 in that the method of FIG. 11 may include many of the same elements. The method of FIG. 11 also includes identifying 1102 a second vehicle operating in the second lane from the first sensor. As discussed above, the first sensor is used to collect observations of the roadway in the form of sensor data. For example, the sensor data may be radar data from a radar sensor, where an observation includes radar return samples of a radar detected object in a particular sampling interval. In another example, the sensor data may be visual data from a camera, where an observation identifies an object in one frame of visual data captured by the camera. The automation module 801 clusters the observations to determine a coherent object and, when the coherent object matches the signature of a vehicle, classifies the coherent object as a vehicle. For example, the automation module 801 may cluster radar return samples to identify a coherent radar object and compares the radar return signal to a known radar signature for a vehicle. The cluster of radar return samples may include a time series of radar return samples over predetermined time period (e.g., 100 milliseconds) that are filtered and smoothed to identify a coherent object. The automation module 801 further determines an object range of the vehicle indicating the distance and position of the vehicle. For example, where a radar sensor is used to collect the observations, the radar data may indicate a distance of the second vehicle from the ego vehicle and an angle of the second vehicle relative to the ego vehicle. The automation module 801 then determines the traveling lane of the second vehicle based on the position of the second vehicle of relative to the ego vehicle and the detected lanes of the roadway. For example, radar data indicating the position of the second vehicle relative to the ego vehicle may be correlated to a lane detected via various lane detection techniques (e.g., visual lane detection) as discussed above. Accordingly, in some examples, the automation module 801 identifies 1102 a second vehicle operating in the second lane from the first sensor.

The method of FIG. 11 also includes determining 1104 a second velocity of the second vehicle. In some examples, the automation module 801 determines 1104 the second velocity of the second vehicle as discussed above. For example, where the sensor data captured by the first sensor is radar data, the change in frequency between two radar return measurements of the second vehicle can be used to determine the rate that the second vehicle is traveling toward or away from the ego vehicle. This rate can be compared to the velocity of the ego vehicle to determine the velocity of the second vehicle. Where visual data from a camera is used, the distance of the second vehicle from a stationary object in a first visual frame can be compared to the distance of the second vehicle from a stationary object in a second visual frame to determine the rate of travel of the second vehicle relative to the stationary object, which indicates the second velocity of the second vehicle.

In the method of FIG. 11, the automation module 801 generates the first lane flow rate based on the first velocity of the first vehicle and the second velocity of the second vehicle. As discussed above, the velocity of two or more vehicles traveling in the second lane can be averaged to determine a velocity component of the first lane flow rate for the second lane. Further, as discussed above, the number of vehicles traveling in the second lane can be used to determine a density component of the first lane flow rate, where the density component is the number of detected vehicles or objects traveling in the second lane and/or the distance between the vehicles or objects traveling in the second lane. For example, the distance between the first vehicle and the second vehicle can be determined through triangulation of object ranges, and this distance may factor into a traffic density rating.

Figure 12:
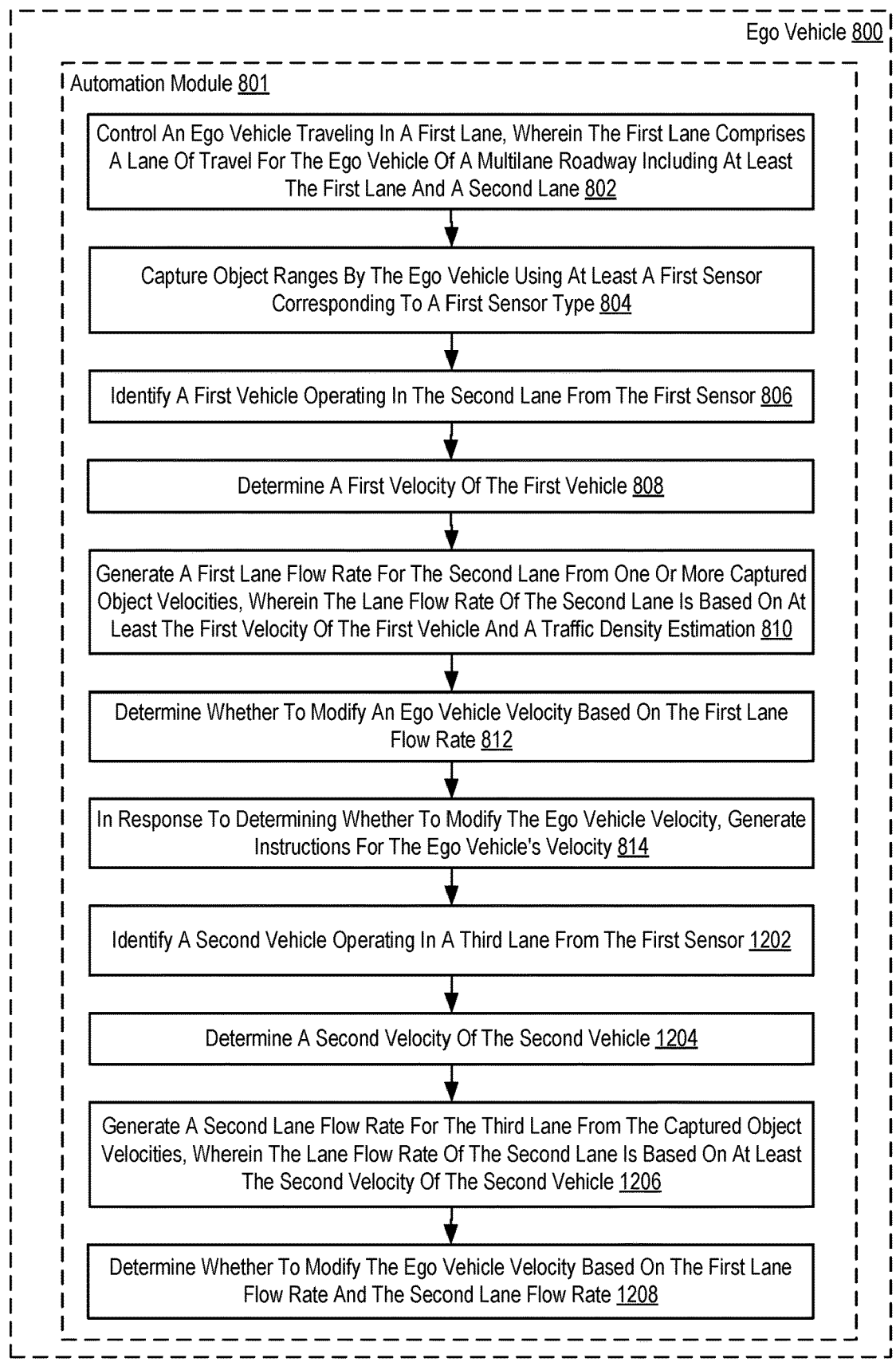
FIG. 12 is a flowchart setting forth another example method of velocity adjustments based on roadway scene comprehension according to some embodiments.

For further explanation, FIG. 12 sets forth a flowchart illustrating an exemplary method for a dynamic velocity adjustment system in accordance with some embodiments. The method of FIG. 12 is similar to the method of FIG. 8 in that the method of FIG. 12 may include many of the same elements. The method of FIG. 12 also includes identifying 1202 a second vehicle operating in a third lane from the first sensor. As discussed above, the automation module 801 determines a distance and angle of a vehicle relative to the ego vehicle (i.e., the position of the object). The automation module 801 then determines the traveling lane of the second vehicle based on the position of the second vehicle of relative to the ego vehicle and the detected lanes of the roadway. For example, radar data indicating the position of the second vehicle relative to the ego vehicle may be correlated to the third lane detected via various lane detection techniques (e.g., radar lane detection or visual lane detection) as discussed above. Accordingly, in some examples, the automation module 801 identifies 1202 a second vehicle operating in a third lane from the first sensor.

The method of FIG. 12 also includes determining 1204 a second velocity of the second vehicle. In some examples, the automation module 801 determines 1204 the second velocity of the second vehicle as discussed above.

The method of FIG. 12 also includes generating 1206 a second lane flow rate for the third lane from the captured object velocities, wherein the lane flow rate of the second lane is based on at least the second velocity of the second vehicle. In some examples, the automation module 801 generates 1206 a second lane flow rate for the third lane from the captured object velocities in the same manner that the automation module 801 generates 810 the first lane flow rate for the second lane from one or more captured object velocities, as discussed above. That is, the velocity, or averaged velocity, of one or more vehicles traveling in the third lane, including the velocity of the second vehicle, represents the velocity for a second lane flow rate. The density of vehicles traveling in the third lane is used to determine a traffic density component of the second lane flow rate.

The method of FIG. 12 also includes determining 1208 whether to modify the ego vehicle velocity based on the first lane flow rate and the second lane flow rate. In some examples, the automation module 801 determines whether to modify the ego vehicle velocity by increasing or decreasing the velocity based on the combined lane flow rates of the second lane and the third lane. This can include increasing the ego velocity if both the first lane flow rate and the second lane flow rate indicate a higher velocity, decreasing the ego velocity if both the first lane flow rate and the second lane flow rate indicate a higher velocity, and determining how to modify the ego vehicle velocity if one lane flow rate indicates a higher velocity and another lane flow rate indicates a lower velocity relative to the ego vehicle's velocity. For example, the automation module 801 may determine that the second lane is immediately to the right of the ego vehicle lane and that the third lane is immediately to the left of the ego vehicle. In some cases, the automation module 801 may match the ego vehicle velocity to the lane flow rate velocity of the second lane. However, if the automation module 801 determines that the lane flow rate velocity of the third lane indicates a much higher velocity, the automation module 801 may determine to increase the ego vehicle velocity based on the lane flow rate velocity of the third lane being significantly higher than the lane flow rate velocity the second lane. In another example, the automation module 801 may determine not to modify the ego vehicle velocity based on the lane flow rate velocity of the second lane being is lower than the ego vehicle velocity (e.g., when ego vehicle is passing vehicles traveling in the right lane). However, if the ego vehicle determines that the lane flow rate velocity of the third lane also indicates a lower velocity (e.g., when the ego vehicle passing vehicles traveling in the left lane), the automation module 801 may determine to decrease the ego vehicle's velocity. In some examples, the automation module 801 weights each lane, such that the flow rate of lanes immediately adjacent to the ego vehicle's driving lane are weighted more than other non-adjacent lanes when determining 1208 whether to modify the ego vehicle velocity based on the first lane flow rate and the second lane flow rate.

In some examples, the automation module 801 generates a roadway velocity scene based on observations from the first lane, the second lane, and the third lane. For example, the automation module 801 captures object ranges and object velocities of objects on the roadway. Based on those object ranges and velocities, the automation module 801 identifies the velocities of vehicles in each of the first lane, the second lane, and the third lane. In this example, the automation module 801 generates a lane flow rate, as discussed above, for each lane based on the vehicle velocities in those lanes. In such an example, automation module 801 constructs a roadway velocity scene that includes each lane flow rate for each lane. In some examples, the second lane and the third lane are adjacent to the first lane in which the ego vehicle is traveling.

In some examples, the automation module 801 identifies a third vehicle operating in a fourth lane from the first sensor. The fourth lane may be a lane that is not adjacent to the first lane in which the ego vehicle is traveling. As discussed above, the automation module 801 determines a distance and angle of a vehicle relative to the ego vehicle (i.e., the position of the object). The automation module 801 then determines the traveling lane of the third vehicle based on the position of the third vehicle of relative to the ego vehicle and the detected lanes of the roadway. For example, radar data indicating the position of the third vehicle relative to the ego vehicle may be correlated to the fourth lane detected via various lane detection techniques (e.g., radar lane detection or visual lane detection) as discussed above. Accordingly, in some examples, the automation module 801 identifies a third vehicle operating in a fourth lane from the first sensor.

In some implementations, the automation module disregards velocity observations from the fourth lane as it is a non-adjacent lane. In other implementations, the automation module 801 generates a third lane flow rate for the fourth lane based on velocity observations of one or more vehicles in the fourth lane. In some examples, the automation module 801 determines whether to modify the ego vehicle velocity based on the first lane flow rate, the second lane flow rate, and the third lane flow rate. However, in other examples, the automation module may not use the third lane flow rate of the fourth lane in determining whether to modify the ego vehicle velocity if, for example, it is determined that the third lane flow rate of the fourth lane exceeds a threshold. For example, traffic in the fourth lane may be traveling too fast, or the difference between the third lane flow rate and the other lane flow rates may be too great.

Figure 13:
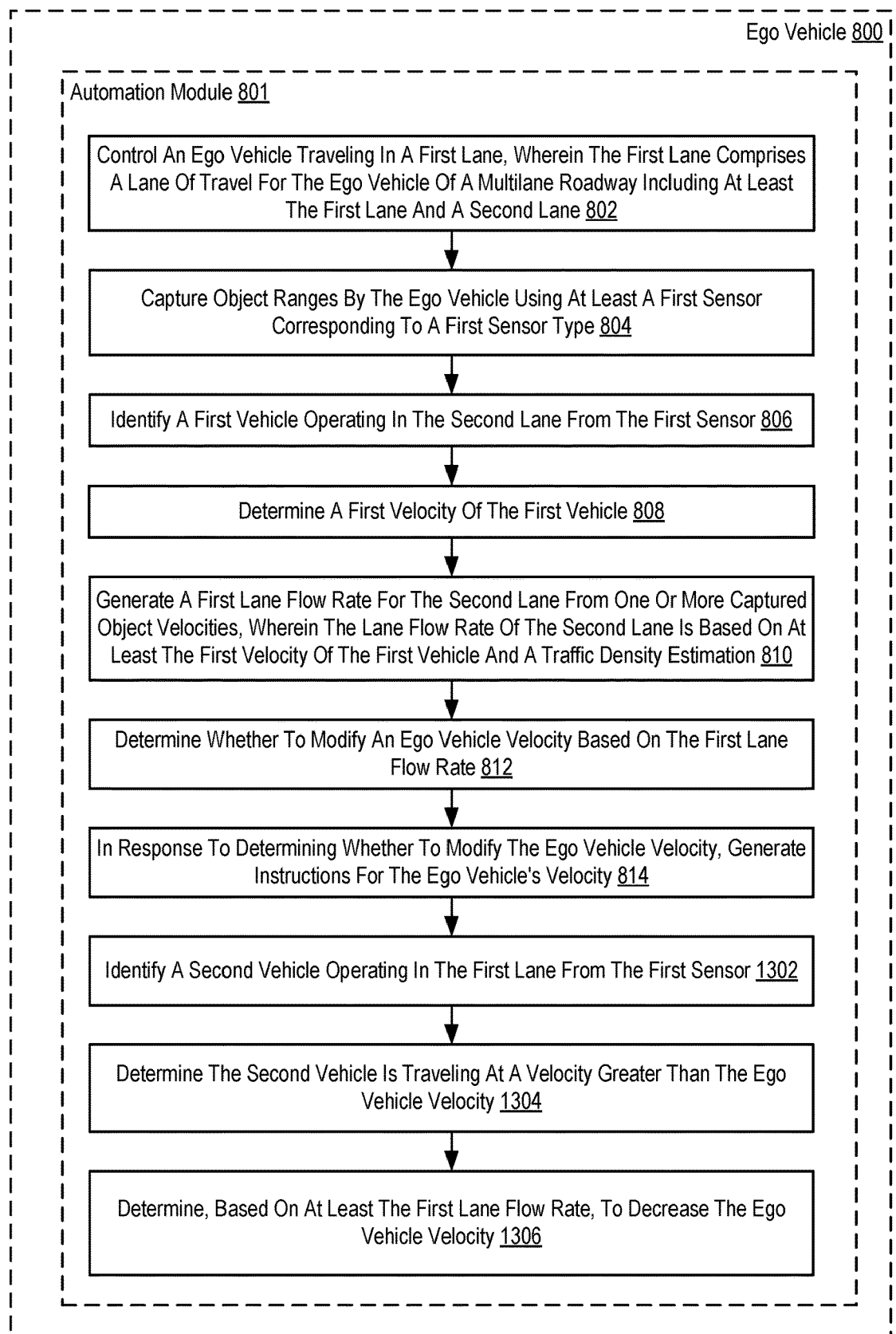
FIG. 13 is a flowchart setting forth another example method of velocity adjustments based on roadway scene comprehension according to some embodiments.

For further explanation, FIG. 13 sets forth a flowchart illustrating an exemplary method for a dynamic velocity adjustment system in accordance with some embodiments. The method of FIG. 13 is similar to the method of FIG. 8 in that the method of FIG. 13 may include many of the same elements. The method of FIG. 13 also includes identifying 1302 a second vehicle operating in the first lane from the first sensor. In some examples, the automation module 801 identifies 1302 a second vehicle operating in the first lane from the first sensor by identifying the vehicle in front of the ego vehicle in the ego vehicle's driving lane. As discussed above, the automation module 801 determines the distance and angle of the second vehicle relative to the ego vehicle (i.e., the position of the object). The automation module 801 may then determine that the traveling lane of the second vehicle is the ego vehicle's traveling lane based on the position of the second vehicle of relative to the ego vehicle and the detected lanes of the roadway. For example, radar data indicating the position of the second vehicle relative to the ego vehicle may be correlated to the first lane (i.e., the ego vehicle's lane) that is detected via various lane detection techniques (e.g., visual lane detection) as discussed above.

The method of FIG. 13 also includes determining 1304 the second vehicle is traveling at a velocity greater than the ego vehicle velocity. In some examples, the automation module 801 determines the velocity of the second vehicle as discussed above. Here, the automation module 801 compares the velocity of the second vehicle to the ego vehicle velocity to determine that the vehicle in front of the ego vehicle in the ego vehicle's driving lane is traveling faster than the ego vehicle.

The method of FIG. 13 also includes determining 1306, based on at least the first lane flow rate, to decrease the ego vehicle velocity. In some examples, the automation module 801 determines to decrease the ego vehicle's velocity even though the vehicle in front of the ego vehicle in the ego vehicle driving lane is traveling faster, based on the velocity indicated by the first flow rate of the second lane. An important metric used by the automation module 801 is the velocity of traffic in the ego vehicle's lane as this ultimately constrains the velocity of the ego vehicle (i.e., the ego vehicle should not travel faster than the vehicle in front of it). However, even if the automation module 801 detects no objects in the ego vehicle's lane for an extended distance or that the vehicle in front of the ego vehicle in the ego vehicle's lane is traveling faster than the ego vehicle, that does not mean the automation module 801 should necessarily accelerate to the speed limit. To provide a more comfortable target velocity, the automation module 801 may use the velocity of vehicles in the adjacent lanes in setting the ego vehicle's velocity. If the first lane flow rate indicates a velocity is lower than the speed limit, the automation module 801 can moderate the ego vehicle's velocity to provide a comfortable speed for the user and reduce the risk of a large velocity difference in the event that a vehicle in an adjacent lane were to pull into the ego vehicle's lane between the ego vehicle and the vehicle in front of it.

Figure 14:
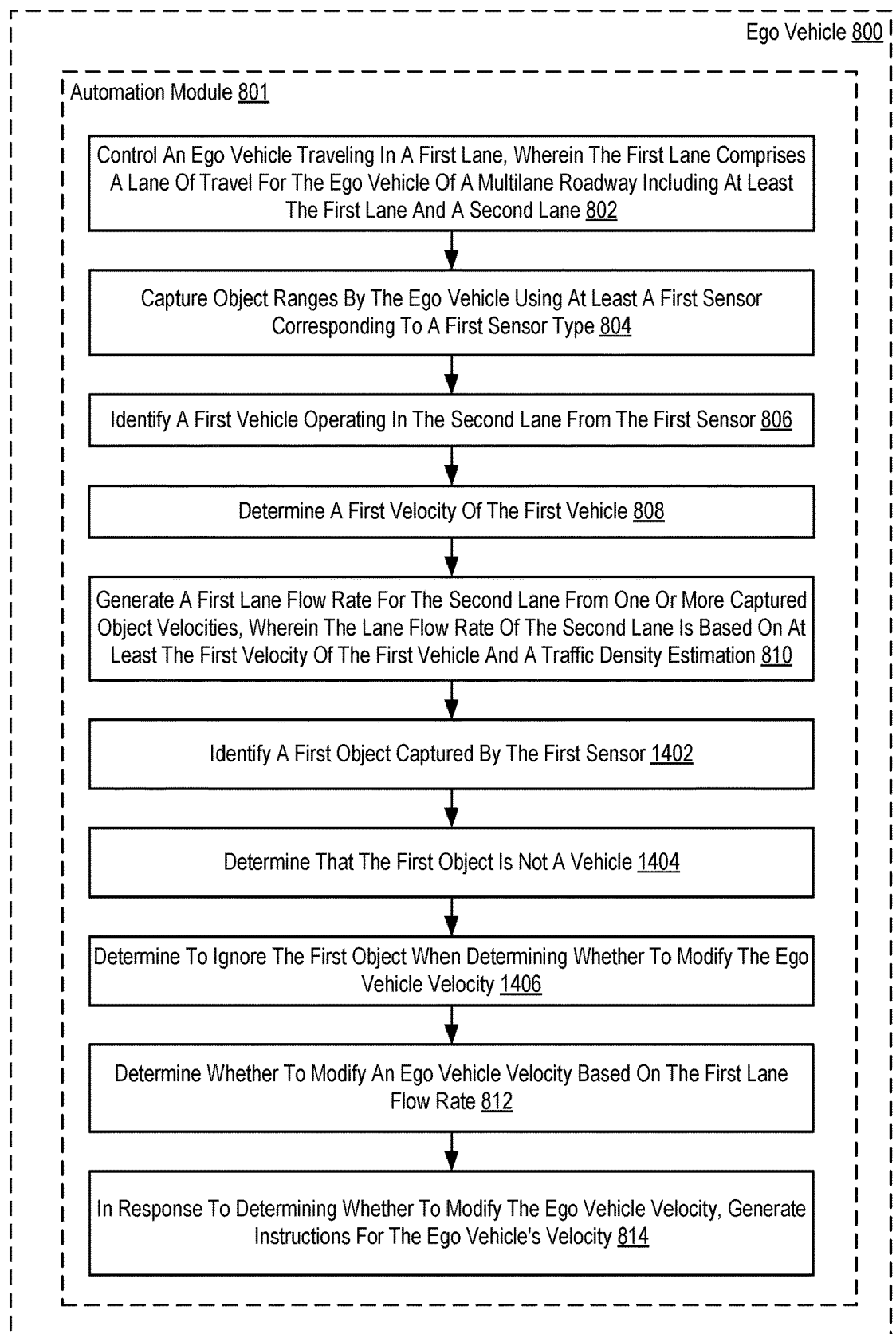
FIG. 14 is a flowchart setting forth another example method of velocity adjustments based on roadway scene comprehension according to some embodiments.

For further explanation, FIG. 14 sets forth a flowchart illustrating an exemplary method for a dynamic velocity adjustment system in accordance with some embodiments. The method of FIG. 14 is similar to the method of FIG. 8 in that the method of FIG. 14 may include many of the same elements. The method of FIG. 14 also includes identifying 1402 a first object captured by the first sensor. In some examples, the automation module 801 identifies 1402 a first object captured by the first sensor by detecting an object on the roadway using, for example, a radar sensor. As discussed above, radar return signals may be used to detect the presence of an object on the roadway.

The method of FIG. 14 also includes determining 1404 that the first object is not a vehicle. In some examples, the automation module 801 determines 1404 that the first object is not a vehicle by determining that the radar return signal for the object does not match a radar signature for a vehicle. In other examples, the automation module 801 determines 1404 that the first object is not a vehicle by determining that a confidence rating for the radar measurement is below a threshold used to determine a valid measurement. For example, the SNR of the received radar return signal may be too low to satisfy a threshold for a valid measurement. In another example, the radar return signal for the object may not be adequately distinguishable from the radar return signal from another object, thus suggesting that the same object has been detected twice.

The method of FIG. 14 also includes determining 1406 to ignore the first object when determining whether to modify the ego vehicle velocity. In some examples, the automation module 801 determines 1406 to ignore the first object when determining whether to modify the ego vehicle velocity by excluding the object when determining captured object ranges and velocities that are used to determine lane flow rates for the roadway. Thus, when determining whether to adjust the ego vehicle velocity based on lane flow rates, the velocity of the object and the presence of the object are not included when calculating the velocity and traffic density of lane flow rate.

Figure 15:
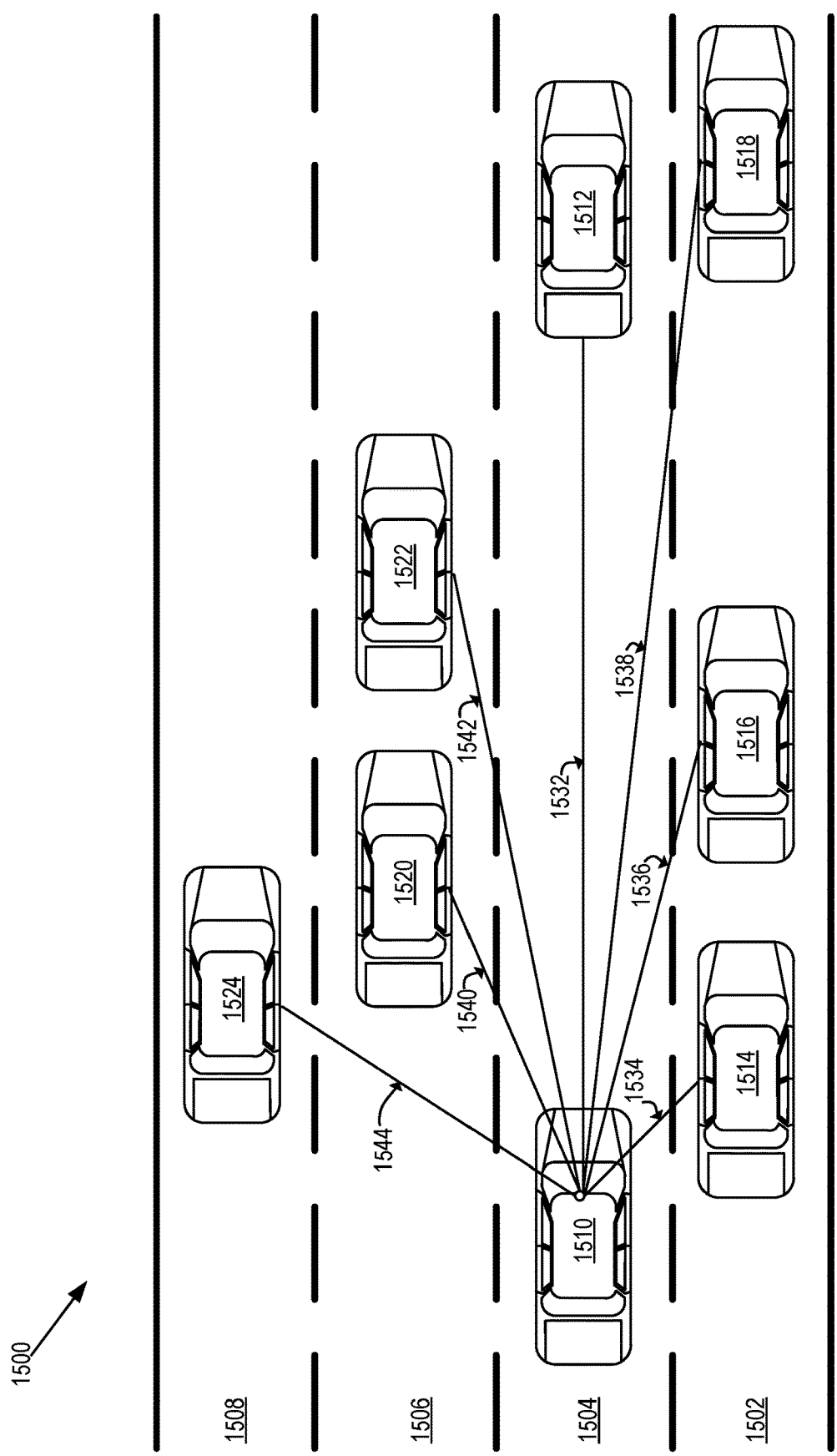
FIG. 15 is an example roadway environment for velocity adjustments based on roadway scene comprehension according to some embodiments.

To aid illustration, FIG. 15 sets forth an example roadway environment 1500 in which an ego vehicle 1510 may autonomously adjust its velocity based on roadway scene comprehension. The example roadway environment 1500 includes four lanes 1502, 1504, 1506, 1508. In this example, the ego vehicle 1510 is traveling in lane 1504 ('the ego vehicle lane'), with lane 1502 adjacent to the right and lane 1506 adjacent to the left. The roadway scene includes vehicles 1512, 1514, 1516, 1518, 1520, 1522, 1524 traveling on the roadway. Directly in front of the ego vehicle in the ego vehicle lane 1504 is vehicle 1512. Three vehicles 1514, 1516, 1518 are traveling in lane 1502 to the right and two vehicles 1520, 1520 are traveling in lane 1506 to the left. Vehicle 1524 is traveling in lane 1508. In this example, the ego vehicle 1510 transmits a radar signal and receives a radar return signal 1532, 1534, 1536, 1538, 1540, 1542, 1544 from vehicles 1512, 1514, 1516, 1518, 1520, 1522, 1524. Based on each radar return signal 1532, 1534, 1536, 1538, 1540, 1542, 1544 the ego vehicle determines the position and velocity of each 1512, 1514, 1516, 1518, 1520, 1522, 1524. The position may be determined based on the distance and angle detected from each radar return signal 1532, 1534, 1536, 1538, 1540, 1542, 1544. The distance can be determined based on the time taken to receive a radar return in response to a radar transmission. The velocity can be determined based on the change in frequency at which radar returns are received. Radar return samples can be collected over a processing interval on the order of milliseconds to determine the velocity of a vehicle. As such, velocity measurements are near-instantaneous.

In the example of FIG. 15, the ego vehicle 1510 determines the lane flow rate velocity and density of lane 1502. A lane flow rate velocity of lane 1502 may be determined based on the velocity of vehicle 1514 alone, where the velocity of vehicle 1514 suggests the lane flow rate velocity. Alternatively, the lane flow rate velocity of lane 1502 may be determined based on average of the velocities of the three detected vehicles 1514, 1516, 1518 that are in lane 1502. In another alternative, the lane flow rate velocity of lane 1502 may be determined based a weighted average, where the velocities of the vehicles 1514, 1516, 1518 are weighted in accordance with their distance from ego vehicle 1510. In yet another alternative, the velocity of vehicle 1518 is excluded from the lane flow rate velocities because the distance between vehicle 1518 and the ego vehicle 1510 is greater than a threshold distance. The ego vehicle 1510 may also determine a lane flow rate density for lane 1502 based on the number of vehicles in lane 1502, the distance between vehicle 1514 and vehicle 1516, and the distance between vehicle 1516 and vehicle 1518.

Similarly, the ego vehicle 1510 determines the lane flow rate velocity and density of lane 1506 and lane 1508. The ego vehicle also determines the velocity of vehicle 1512 in the ego vehicle lane 1504. The velocity of vehicle 1512, the optimal distance between the ego vehicle 1510 and vehicle 1512, and the posted speed limit (or a predetermined maximum safe speed) are constraints on how high the velocity of the ego vehicle 1510 may be increased in response to the roadway scene. For example, even if lanes 1502 and 1506 are traveling faster than the ego vehicle 1510, the ego vehicle 1510 will not set a target minimum that decreases the distance between the ego vehicle 1510 and vehicle 1512 beyond an optimal distance. The ego vehicle 1510 will also not exceed the posted speed limit or a predetermined safe speed (e.g., based on historical traffic patterns) despite traffic in other lanes traveling faster than the posted speed limit or predetermined maximum safe speed.

The ego vehicle 1510 may construct a representation of the roadway scene based on the lane flow rates of the lanes 1502, 1504, 1506, 1508 of the roadway and make adjustments to the velocity of the ego vehicle 1510 based on the roadway scene. The lane flow rates of adjacent lanes 1502, 1506 may be weighted more than lane 1508 when determining whether to adjust the velocity of the ego vehicle 1510. In some examples, velocity observations related to the non-adjacent lane 1508 may be disregarded altogether. To further aid illustration, consider an example where traffic in lane 1502 and lane 1506 are traveling slower than the ego vehicle 1510. The ego vehicle 1510 may determine to decrease the velocity of the ego vehicle 1510 to match the velocity of lanes 1502 and 1506. Consider another example where traffic in lane 1502 and lane 1506 are traveling faster than the ego vehicle 1510. The ego vehicle 1510 may determine to increase the velocity of the ego vehicle 1510 to match the velocity of lanes 1502 and 1506. Consider yet another example where vehicle 1512 is traveling faster than the ego vehicle 1510 but traffic in lane 1502 and lane 1506 are traveling slower than the ego vehicle 1510. The ego vehicle 1510 may determine to decrease the velocity of the ego vehicle 1510 to match the velocity of lanes 1502 and 1506 despite traffic in the ego vehicle lane 1504 traveling faster. Consider yet another example where the ego vehicle 1510 is traveling at a velocity near the traffic in lane 1506 but is being passed by traffic in lane 1502 on the right. The ego vehicle 1510 may determine to increase the velocity of the ego vehicle 1510 to match the velocity of traffic in lane 1502. In such an example, the velocity of traffic traveling in a lane to the right, when faster than the ego vehicle's velocity, is weighted more than the velocity of traffic in the lane to the left. In yet another example, the ego vehicle 1510 may determine that vehicle 1520 is a tractor-trailer based on a radar return signature. The ego vehicle 1510 may determine to decrease the velocity of the ego vehicle 1510 to allow the tractor-trailer to pass more quickly.

The above examples provided in the context of the roadway environment 1500 are for illustrative purposes and do not limit the scope of this disclosure. Readers will appreciate that the dynamic velocity adjustment system can operate in a variety of roadway environments. Readers will also recognize that, within the context of FIG. 15, there are numerous examples in addition to the examples above that are within the scope of this disclose although not specifically identified here. Readers will further appreciate that the ego vehicle may apply the various traffic conditions of the roadway discussed above as inputs to various functions, mapping tables, thresholds, heuristics, machine learning models, or combinations thereof such that the ego vehicle makes velocity adjustment decisions based its perception of those traffic conditions include traffic conditions outside of the ego vehicle's lane.

Figure 16:
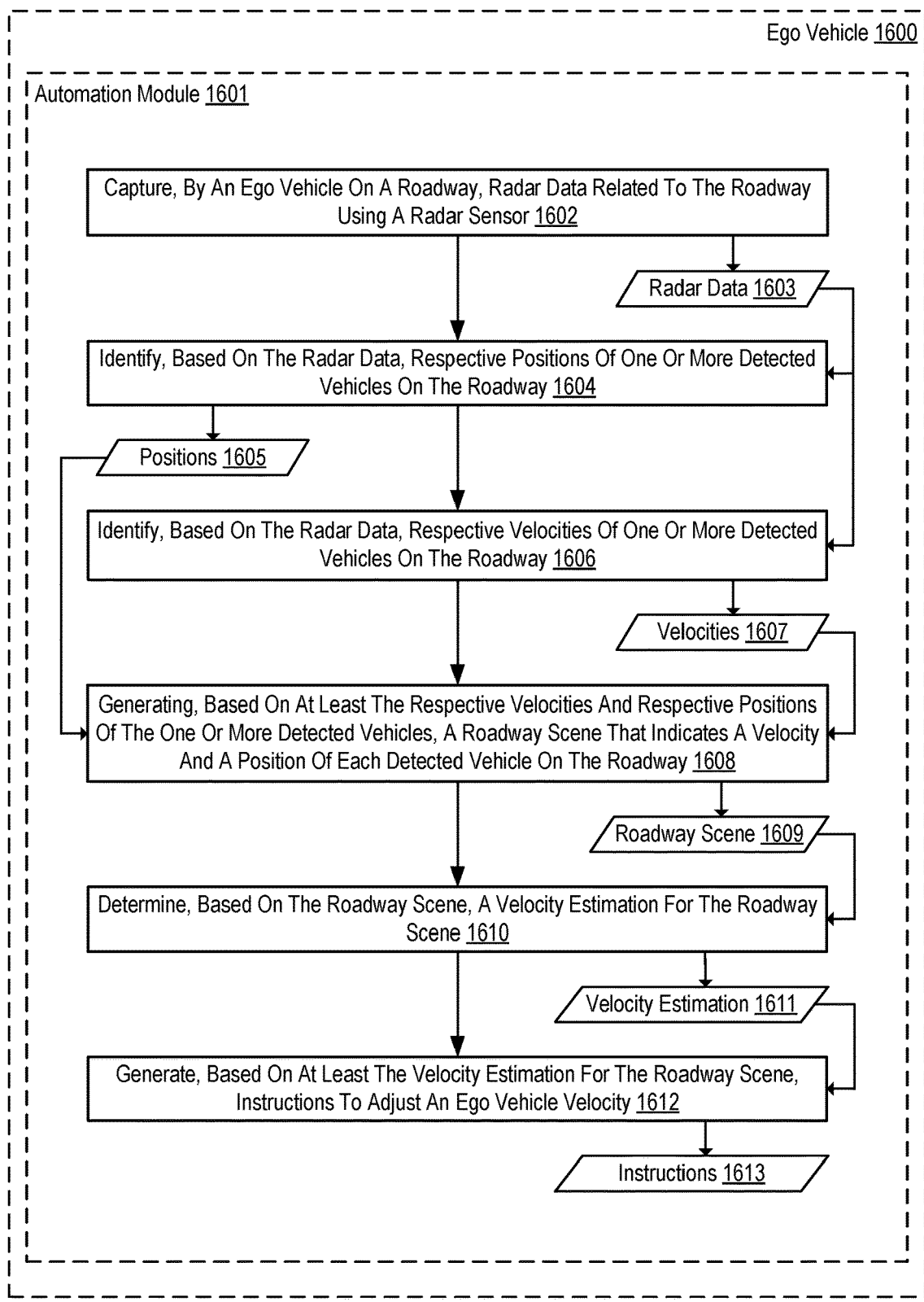
FIG. 16 is a flowchart setting forth another example method of velocity adjustments based on roadway scene comprehension according to some embodiments.

For further explanation, FIG. 16 sets forth a flowchart illustrating an exemplary method for a dynamic velocity adjustment system in accordance with some embodiments. The method of FIG. 16 includes capturing 1602, by an ego vehicle 1600 on a roadway, radar data 1603 related to roadway using a radar sensor. In some examples, the ego vehicle 1600 includes an automation module 1601 (e.g., the automation module 220 of FIG. 2 or the automation module 801 of FIGS. 8-14) configured to make driving decisions based on sensor data captured by ego vehicle sensors. The automation module 1601 generates instructions, based on the driving decisions, for an autonomous vehicle control system to assist driving or to operate the vehicle autonomously on the roadway. In some examples, a radar sensor of the ego vehicle transmits a radar signal and receives one or more radar return signals from one or more objects on or adjacent to the roadway. The objects may be stationary objects (e.g., trees, road signs, stopped vehicles) or moving objects (e.g., moving vehicles). The radar return signal of a particular object may include multiple radar reflections that are generated by the object. In some examples, the automation module 1601 clusters the multiple reflections to identify a radar return signal that corresponds to that object. The frequency and/or phase of the radar return signal for an object is measured over a coherent processing interval in which the transmitted radar signal is pulsed, and the radar return signal is received from the object. Thus, in some examples, the automation module 1601 of the ego vehicle 1600 captures 1602 the radar data 1603 by collecting radar measurements for one or more radar-detected objects during at least one coherent processing interval. The time period of the coherent processing interval may be relatively short (on the order of milliseconds) such that an instantaneous measurement of the object can be approximated using a single radar measurement. Thus, properties of radar-detected objects, such as distance or position relative to the ego vehicle 1600 as well as velocity of the object, may be determined based on the Doppler effect based on radar measurements.

The method of FIG. 16 also includes identifying 1604, based on the radar data 1603, respective positions 1605 of one or more detected vehicles on the roadway. In some examples, the automation module 1601 determines that a particular object is a vehicle by comparing the radar return signal of that object to a radar signature of a vehicle or one or more types of vehicles. The radar return signal may be filtered and smoothed over multiple radar measurements in order to classify the object as a vehicle. Based on the radar measurements, the automation module 1601 determines the distance of the vehicle from the ego vehicle 1600. Also based on the radar measurements, the automation module 1601 determines the angle of the vehicle relative to the ego vehicle 1600 based on the angle of detection of the radar observations. Based on the distance and angle of the vehicle relative to the ego vehicle 1600, the automation module 1601 determines the position of the vehicle relative to the ego vehicle 1600. This process is repeated for each detected objected. In some cases, a detected object may not be classified as vehicle if the radar return signature does not match the radar return signal for a vehicle or if there is insufficient confidence in the radar measurement based on, for example, a low SNR or the inability to identify that successive radar measurements correspond to the same object.

The method of FIG. 16 also includes identifying 1606, based on the radar data 1603, respective velocities 1607 of one or more detected vehicles on the roadway. In some examples, for each detected vehicle, the automation module 801 determines the velocity of that vehicle based on one or more radar measurements. For example, the instantaneous velocity of the vehicle can be approximated by measuring the change in frequency of the radar return signal of an object during the coherent processing interval. Based on the Doppler effect, the velocity of the vehicle can be determined in proportion to the ego vehicle's velocity by observing this change in frequency.

The method of FIG. 16 also includes generating 1608, based on at least the respective velocities 1607 and respective positions 1605 of the one or more detected vehicles, a roadway scene 1609 that indicates a velocity and a position of each detected vehicle on the roadway. In some examples, the automation module 801 generates 1608 the roadway scene 1609 by creating a data representation of the ego vehicle's comprehension of vehicles on the roadway, where data in the representation indicates the velocity of each detected vehicle and position of each detected vehicle relative to the ego vehicle 1600 at particular points in time. In some examples, the representation of the roadway identifies additional attributes, such as the type of vehicle or an acceleration/deceleration rate of the vehicle. In some examples, the roadway scene 1609 is enhanced by correlating the roadway scene 1609 to other data such as visual data obtained from a camera. For example, identified vehicles and their positions may be correlated to vehicles identified via visual data, or vehicle positions can be correlated to driving lanes detected via visual data, and so on.

The method of FIG. 16 also includes determining 1610, based on the roadway scene 1609, a velocity estimation 1611 for the roadway scene 1609. The velocity estimation 1611 is a wholistic valuation of the velocities of all detected vehicles represented in the roadway scene 1609. The velocity estimation 1611 may be a single velocity value that represents the velocity of the roadway scene. In some examples, the automation module 1601 determines the velocity estimation 1611 based on an average of the velocities 1607 of the detected vehicles. For example, the average can be a weighted average based on attributes of the vehicle, such as the distance or position of the detected vehicle, the driving lane of the detected vehicle, and so on, as described in more detail below. In another example, the automation module 1601 may omit vehicle velocities from the velocity estimation 1611 when those vehicles are beyond a predetermined distance from the ego vehicle 1600.

In a particular example, the velocity estimation 1611 is based on a weighted average of the respective velocities where the respective velocities of the detected vehicles are weighted in accordance with their distance from the ego vehicle 1600. For example, where a detected vehicle is within a particular range relative to the ego vehicle 1600, the automation module 1601 applies a higher weight to that vehicle velocity. Thus, vehicles in a particular proximity to the ego vehicle 1600 contribute more to the velocity estimation 1611 of the roadway scene than detected vehicles that are outside of that range. Using this approach, it is not necessary to determine the lane in which the detected vehicle is traveling. In such examples, the velocity estimation 1611 is indicative of the velocities of vehicles in the immediate vicinity of the ego vehicle, whether those vehicles are in the ego vehicle lane or lanes adjacent to the ego vehicle lane. In some variations, the automation module 1601 may omit vehicle velocities from the velocity estimation 1611 when those vehicles are beyond a predetermined distance from the ego vehicle 1600.

In a particular example, the velocity estimation 1611 is based on a weighted average of the respective velocities where the respective velocities of the detected vehicles are weighted in accordance with the lane of the ego vehicle. As discussed above, the lane of a detected vehicle may be identified by correlating radar-detected position of the vehicle to a roadway lane detected through various lane detection techniques. For example, lanes may be detected using radar data alone, as discussed above. In other examples, lanes may be detected using visual data alone. In still further examples, lanes may be detecting using a combination of radar data and visual data. Knowing the driving lane of the detected vehicle, the automation module 1601 may apply a higher weight to velocities of detected vehicles traveling in adjacent lanes, where the velocities of vehicles traveling in non-adjacent lanes are accorded a lower weight.

In a particular example, the velocity estimation 1611 is based on a weighted average of the respective velocities where the respective velocities of the detected vehicles are weighted in accordance with a confidence rating. For example, the automation module 1601 may determine a confidence rating for a particular radar measurement, or velocity or position derived from that measurement, based on a confidence level in the radar measurement. For example, if the radar return signal has a low SNR, the position or velocity of the detected vehicle derived from that measurement may be accorded a lower weight when determining the velocity estimation 1611. In another example, the automation module 1601 may have low confidence that two detected objects are in fact two different vehicles. In such an example, a velocity of those objects may be accorded a lower weight when determining the velocity estimation 1611.

The method of FIG. 16 also includes generating 1612, based on at least the velocity estimation 1611 for the roadway scene 1609, instructions 1613 to adjust an ego vehicle velocity. In some examples, the automation module 1601 compares the velocity estimation 1611 to the current velocity of the ego vehicle 1600 to determine whether to adjust the velocity of the ego vehicle 1600. When the automation module 1601 determines that the velocity of the ego vehicle 1600 should be increased or decreased to track the velocity estimation 1611 of the roadway scene 1609, the automation module 1601 generates the appropriate instructions and transmits them to an autonomous vehicle control system that adjusts the velocity of the ego vehicle 1600, as discussed above. When determining how much to increase the velocity of the ego vehicle 1600, the increase in velocity is constrained by the posted speed limit (or a predetermined maximum safe speed) and the forward distance that is maintained between the ego vehicle and vehicle directly in front of the ego vehicle in the ego vehicle lane.

In view of the foregoing, it will be appreciated that the flow of the roadway scene flow is perceived based on the detected position and velocity of vehicles in the scene. By knowing the position and velocity of the vehicles in the scene, the automation module 1601 can estimate the speed of travel of both the entire scene and of individual lanes within the scene. By knowing the estimated speed of the general roadway scene, the ego lane, and the lanes near the ego lane, the automation module 1601 can determine what the speed of the vehicle should be given the speed of the traffic around it. This will prevent the ego vehicle 1600 from traveling too fast or too slow for the relative speed of the surrounding traffic. The automation module 1601 can also use the speed limit to provide maximum limits for vehicle speed in traffic. This eliminates the need of a user to set a specific cruise speed. The speed of the vehicle will be determined by the speed limit and the safe speed given the flow of traffic in the scene.

Figure 17:
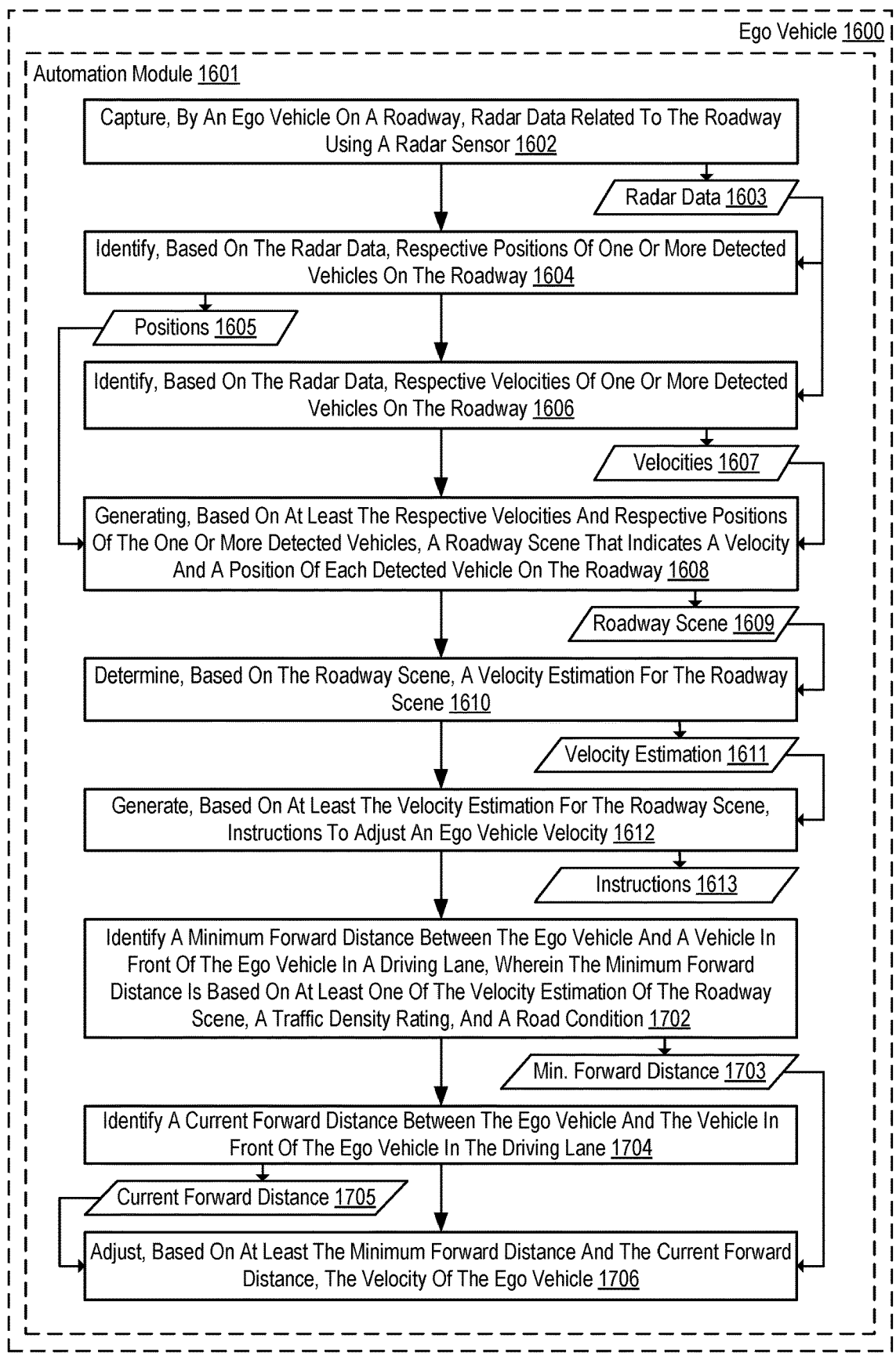
FIG. 17 is a flowchart setting forth another example method of velocity adjustments based on roadway scene comprehension according to some embodiments.

For further explanation, FIG. 17 sets forth a flowchart illustrating an exemplary method for a dynamic velocity adjustment system in accordance with some embodiments. The method of FIG. 17 is similar to the method of FIG. 16 in that the method of FIG. 17 may include many of the same elements. The method of FIG. 17 also includes identifying 1702 a minimum forward distance 1703 between the ego vehicle and a vehicle in front of the ego vehicle in a driving lane, wherein the minimum forward distance is based on at least one of the velocity estimation of the roadway scene, a traffic density rating, and a road condition. The ego vehicle 1600 maintains a forward, or following, distance between the ego vehicle and the ego vehicle in front of it. A general metric may be to leave, for example, two car lengths. However, various traffic and road conditions may affect the comfort of the driver/passengers. For example, when traffic around the vehicle is traveling at a high velocity, it may be safer and improve driver comfort if the forward distance is increased above some nominal level. Continuing the example, it may be advantageous to leave four car lengths when traffic around the ego vehicle is traveling particularly fast. Thus, in some examples, the automation module 1601 identifies the minimum forward distance 1703 by evaluating traffic and road conditions and determining the minimum forward distance based on those conditions. For example, the automation module 1601 may identify minimum forward distance based on the ego vehicle velocity using, for example, a function or mapping table that maps ego vehicle velocity to a minimum forward distance. In such an example, the minimum forward distance increases based on an increase in ego vehicle velocity. Using a minimum forward distance based on ego vehicle velocity as a starting point, the automation module 801 may determine to increase the minimum forward distance even more based on other conditions. In one example, the automation module 1601 increases the minimum forward distance in response to the velocity estimation 1611. If traffic around the ego vehicle is traveling faster than the ego vehicle, the automation module 1601 may determine to increase the minimum forward distance 1703. The minimum forward distance can be increased, for example, in proportion to the velocity estimation 1611. In another example, the automation module 1601 increases the minimum forward distance based on traffic density. As will be discussed in more detail below, the automation module 1601 may identify a traffic density rating based on the number of detected vehicles and the distances between the detected vehicles. If traffic around the ego vehicle is dense, signaling traffic congestion, the automation module 1601 may determine to increase the minimum forward distance 1703 in anticipation of other drivers trying to move abruptly into the ego vehicle lane. In another example, the automation module 1601 increases the minimum forward distance based on road conditions. If the road is icy, the windshield wipers are on, or temperatures below freezing are detected, the automation module 1601 may determine increase the minimum forward distance 1703. For example, the minimum forward distance may be increased by some fixed amount or proportional amount in response to detecting poor road conditions.

The method of FIG. 17 also includes identifying 1704 a current forward distance 1705 between the ego vehicle 1600 and the vehicle in front of the ego vehicle in the driving lane. In some examples, the automation module 1601 identifies the distance to the vehicle in front of the ego vehicle 1600 based on radar data, as discussed above.

The method of FIG. 17 also includes adjusting 1706, based on at least the minimum forward distance 1703 and the current forward distance 1705, the velocity of the ego vehicle. In some examples, the automation module 1601 compares the current forward distance 1705 to the minimum forward distance. If the current forward distance 1705 is greater than the minimum forward distance 1703, the automation module 1601 may determine to increase the ego vehicle velocity in response to other factors, such as the velocity estimation 1611 of the roadway scene 1609. However, when making velocity adjustments, the automation module 1601 will not adjust the velocity in a way that violates the minimum forward distance 1703. If the current forward distance 1705 is less than the minimum forward distance 1703 or the minimum forward distance 1703 decreases in response to a traffic or road condition, the automation module 1601 may decrease the ego vehicle velocity to maintain the minimum forward distance. To aid illustration, consider an example where the ego vehicle is following a vehicle in front it, where the distance to that vehicle is equal to the minimum forward distance. In this example, an increase in the velocity estimation 1611 of the roadway scene or an increase in a traffic density rating of the roadway scene 1609 may cause the automation module 1601 to increase the minimum forward distance. In such an example, the automation module 1601 decreases the ego vehicle velocity to adjust to the new minimum forward distance.

Figure 18:
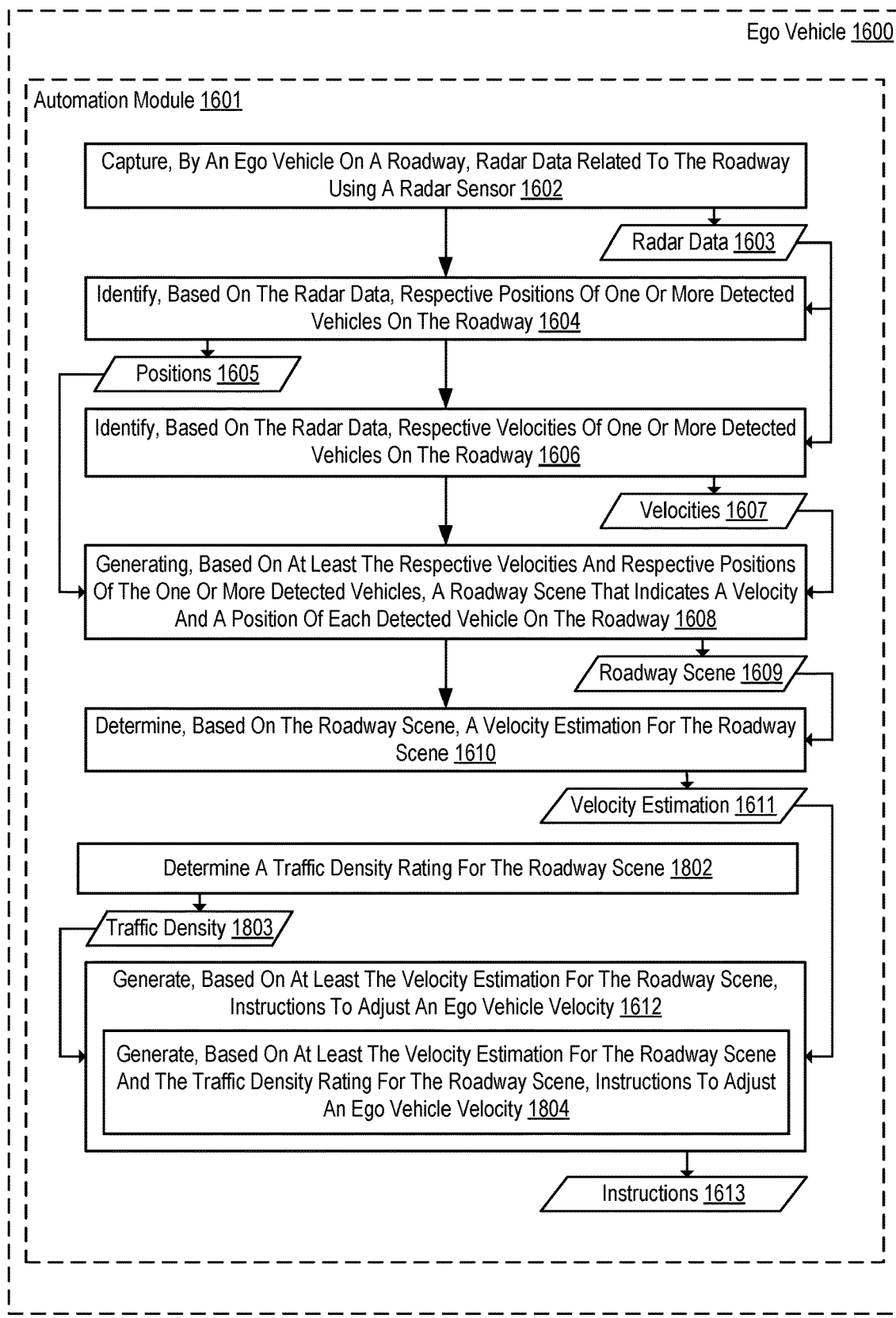
FIG. 18 is a flowchart setting forth another example method of velocity adjustments based on roadway scene comprehension according to some embodiments.

For further explanation, FIG. 18 sets forth a flowchart illustrating an exemplary method for a dynamic velocity adjustment system in accordance with some embodiments. The method of FIG. 18 is similar to the method of FIG. 16 in that the method of FIG. 18 may include many of the same elements. The method of FIG. 18 also includes determining 1802 a traffic density rating 1803 for the roadway scene 1609. In some examples, the automation module 1601 determines 1802 the traffic density rating 1803 by determining the number of detected vehicles in the roadway scene 1609 and the distances between vehicles in the roadway scene 1609. For example, the traffic density rating 1803 may increase as the number of detected vehicles in the roadway scene 1609 increases. Further the traffic density rating 1803 may increase based on an average distance between detected vehicles in the roadway scene 1609. In some examples, the automation module 1601 determines the distances between detected vehicles in the roadway scene by triangulating radar measurements. The automation module 1601 may then determine an average distance between vehicles that can be used for a traffic density rating. In another example, the automation module 1601 may weight the distances between vehicles based on the distance of those vehicles from the ego vehicle 1600, and then determine a weighted average of the distances between vehicles. This approach provides a density rating that is based on the distances between vehicles in proximity to the ego vehicle and more accurately reflects the localized roadway environment of the ego vehicle. The number of vehicles and the averaged distances between those vehicles may be factored together to arrive at the traffic density rating. For example, a traffic density rating may be based on a table or function that takes the number of vehicles and the averaged distance between vehicles as inputs and outputs a traffic density rating.

In the example of FIG. 18, generating 1612, based on at least the velocity estimation 1611 for the roadway scene 1609, instructions 1613 to adjust an ego vehicle velocity includes generating 1804, based on at least the velocity estimation 1611 for the roadway scene 1609 and the traffic density rating 1803 for the roadway scene 1609, instructions 1613 to adjust an ego vehicle velocity. In some examples, the automation module 1601 generates the instructions 1613 to adjust the ego vehicle velocity based on the velocity estimation and the traffic density rating 1803. Thus, the automation module 1601 evaluates both the speed of the surrounding vehicles and the density of those vehicles when adjusting the ego vehicle velocity. For example, the automation module 1601 may determine not to match the ego vehicle velocity to the velocity estimation of the roadway scene 1609 if the traffic density rating 1803 is high, suggesting traffic congestion. As a safety measure and to enhance driver comfort, it may be advantageous to travel slower than the surrounding traffic in dense traffic conditions. Further, in another example, the automation module 1601 may determine that the ego vehicle velocity should be matched to the value of the velocity estimation 1611 only when the traffic density rating is low, and should be adjusted to some velocity below the value of the velocity estimation of the roadway scene as traffic density increases. By contrast, if the value of the velocity estimation 1611 is slower than the posted speed limit or predetermined maximum safe speed, the automation module 1601 may determine to increase the ego vehicle velocity beyond the velocity estimation 1611 of the roadway scene if the traffic density rating for the roadway is low.

Figure 19:
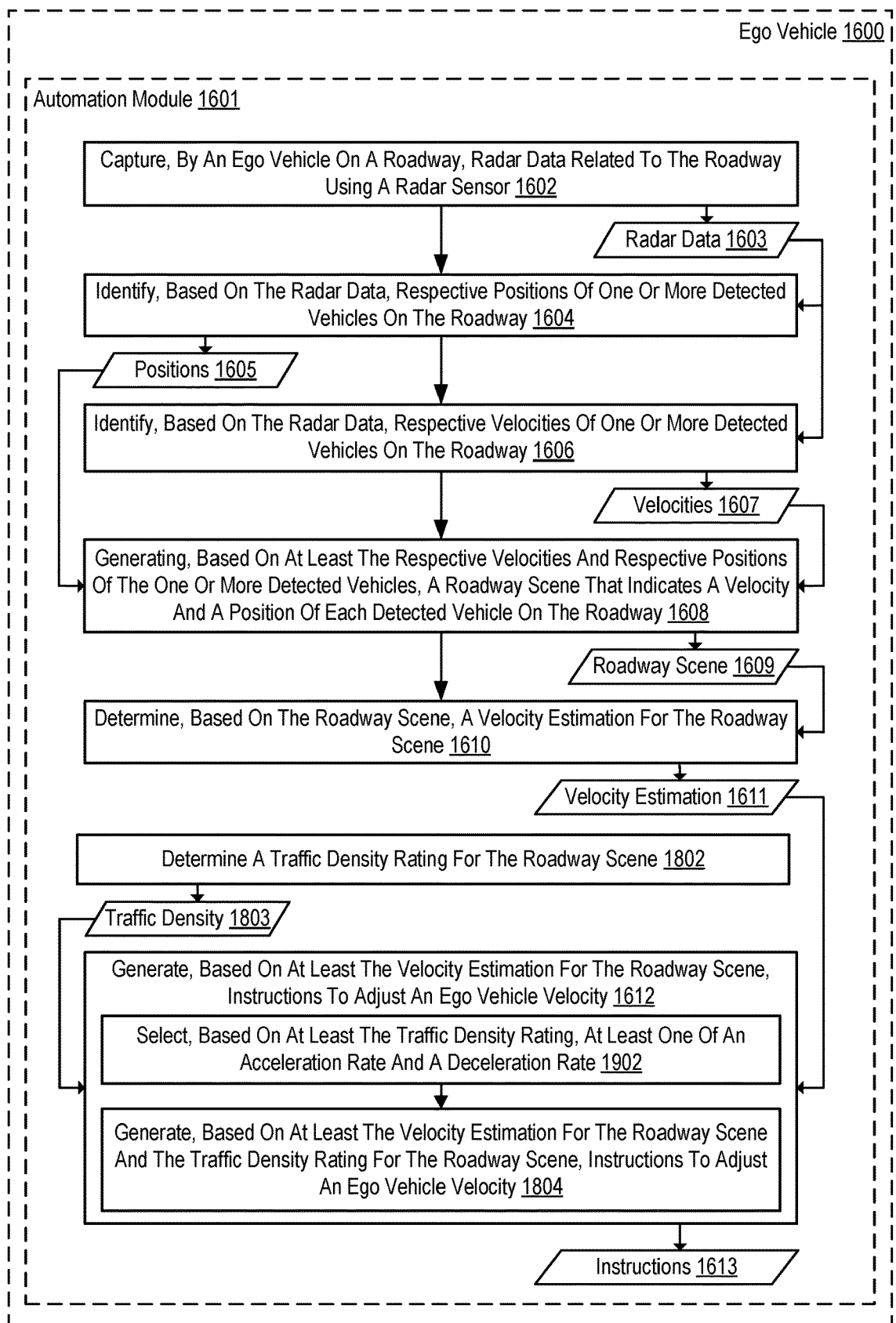
FIG. 19 is a flowchart setting forth another example method of velocity adjustments based on roadway scene comprehension according to some embodiments.

For further explanation, FIG. 19 sets forth a flowchart illustrating an exemplary method for a dynamic velocity adjustment system in accordance with some embodiments. The method of FIG. 19 is similar to the method of FIG. 18 in that the method of FIG. 19 may include many of the same elements. In the method of FIG. 19, generating 1612, based on at least the velocity estimation 1611 for the roadway scene 1609, instructions 1613 to adjust an ego vehicle velocity also includes selecting 1902, based on at least the traffic density rating 1803, at least one of an acceleration rate and a deceleration rate. An ego vehicle 1600 may utilize various acceleration patterns for acceleration and decelerating the ego vehicle 1600. In some examples, the automation module 1601 uses different rates of acceleration or deceleration depending on the density of the vehicles around the ego vehicle 1600. In one example, when the traffic density rating 1803 for the roadway scene 1609 is high, the automation module 1601 selects a relatively slower rate to accelerate and decelerate the ego vehicle 1600, compared to a normal pattern of acceleration or deceleration, in order to minimize repeated stops and starts in heavy traffic.

Figure 20:
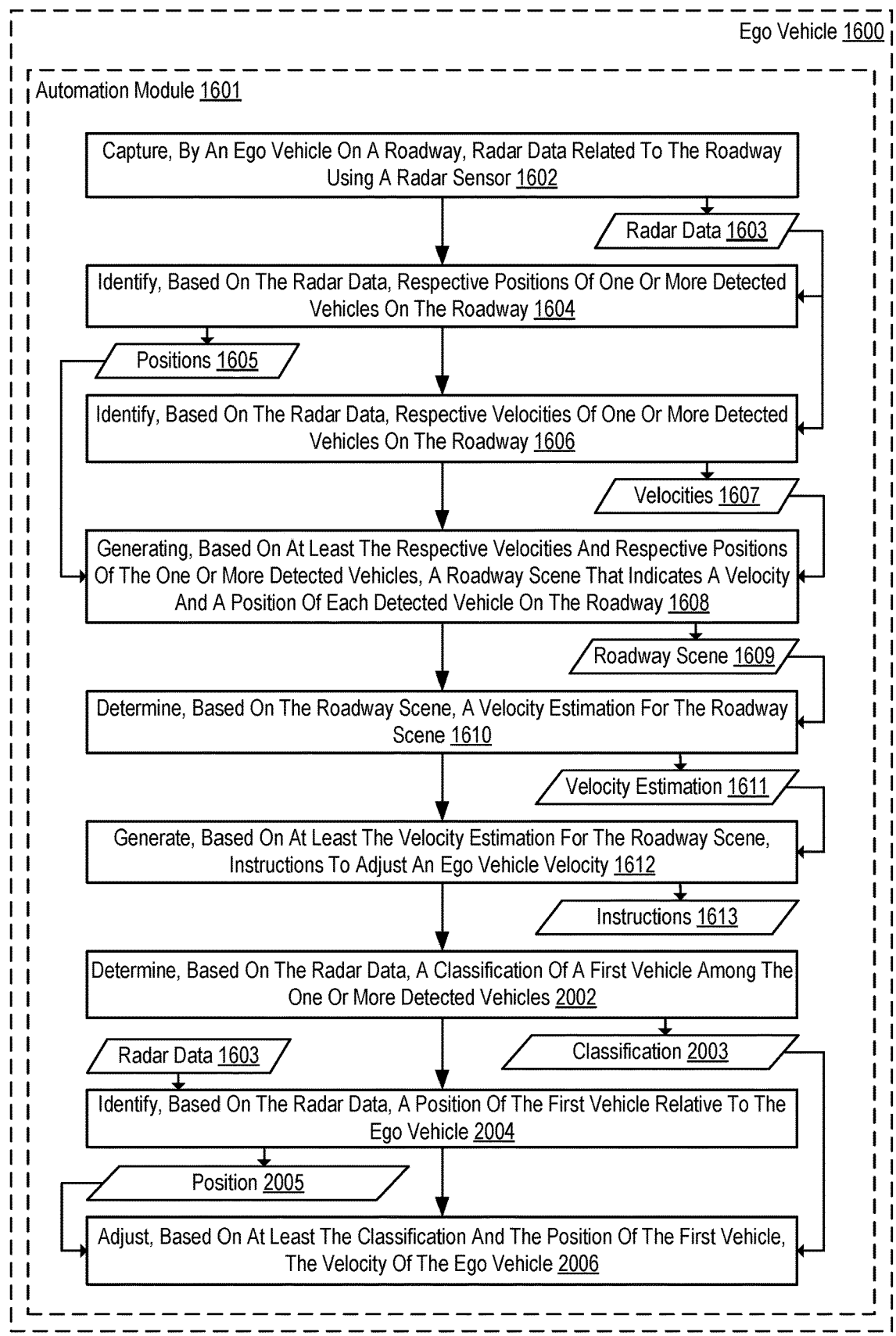
FIG. 20 is a flowchart setting forth another example method of velocity adjustments based on roadway scene comprehension according to some embodiments.

For further explanation, FIG. 20 sets forth a flowchart illustrating an exemplary method for a dynamic velocity adjustment system in accordance with some embodiments. The method of FIG. 20 is similar to the method of FIG. 16 in that the method of FIG. 20 may include many of the same elements. The method of FIG. 20 also includes determining 2002, based on the radar data 1603, a classification 2003 of a first vehicle among the one or more detected vehicles. In some examples, the automation module 1601 determines 2002 the classification 2003 by comparing the radar return signal of an object to radar signatures of various types of vehicles. For example, the automation module 1601 may determine that the radar return signal of an object corresponds to a radar signature for a tractor-trailer, semi-truck, or bus. Repeated radar returns from the same object over a particular distance may indicate that the radar object is a large truck or bus.

The method of FIG. 20 also includes identifying 2004, based on the radar data 1603, a position 2005 of the first vehicle relative to the ego vehicle 1600. In some examples, the automation module 1601 determines the position 2005 of the first vehicle in the same manner as other detected vehicles, as discussed above. For example, a rear facing radar sensor may detect that the large truck is approaching the ego vehicle from behind and on the left, and at a velocity that is greater than that of the ego vehicle. In another example, a forward-facing radar sensor may determine that the ego vehicle is approaching a large truck on the right at a velocity that is faster than the large truck.

The method of FIG. 20 also includes adjusting 2006, based on at least the classification 2003 and the position 2005 of the first vehicle, the velocity of the ego vehicle 1600. In some examples, the automation module 1601 increases or decreases the ego vehicle velocity in response to identifying a particular type of vehicle and that vehicles velocity and position. For example, if a large truck is detected to be approaching the ego vehicle 1600 from behind and on the left (i.e., being passed by the truck on the left), the automation module 1601 may determine to decrease the ego vehicle velocity to allow the large truck to pass the ego vehicle 1600 more quickly. In another example, if the automation module 1601 determines that the ego vehicle 1600 is approaching a large truck on the right (i.e., passing the truck on the right), the automation module 1601 may determine to increase the ego velocity to pass the truck more quickly. This behavior enhances the comfort of the driver, who may not feel comfortable traveling directly next to a large truck or bus in an adjacent lane.

Figure 21:
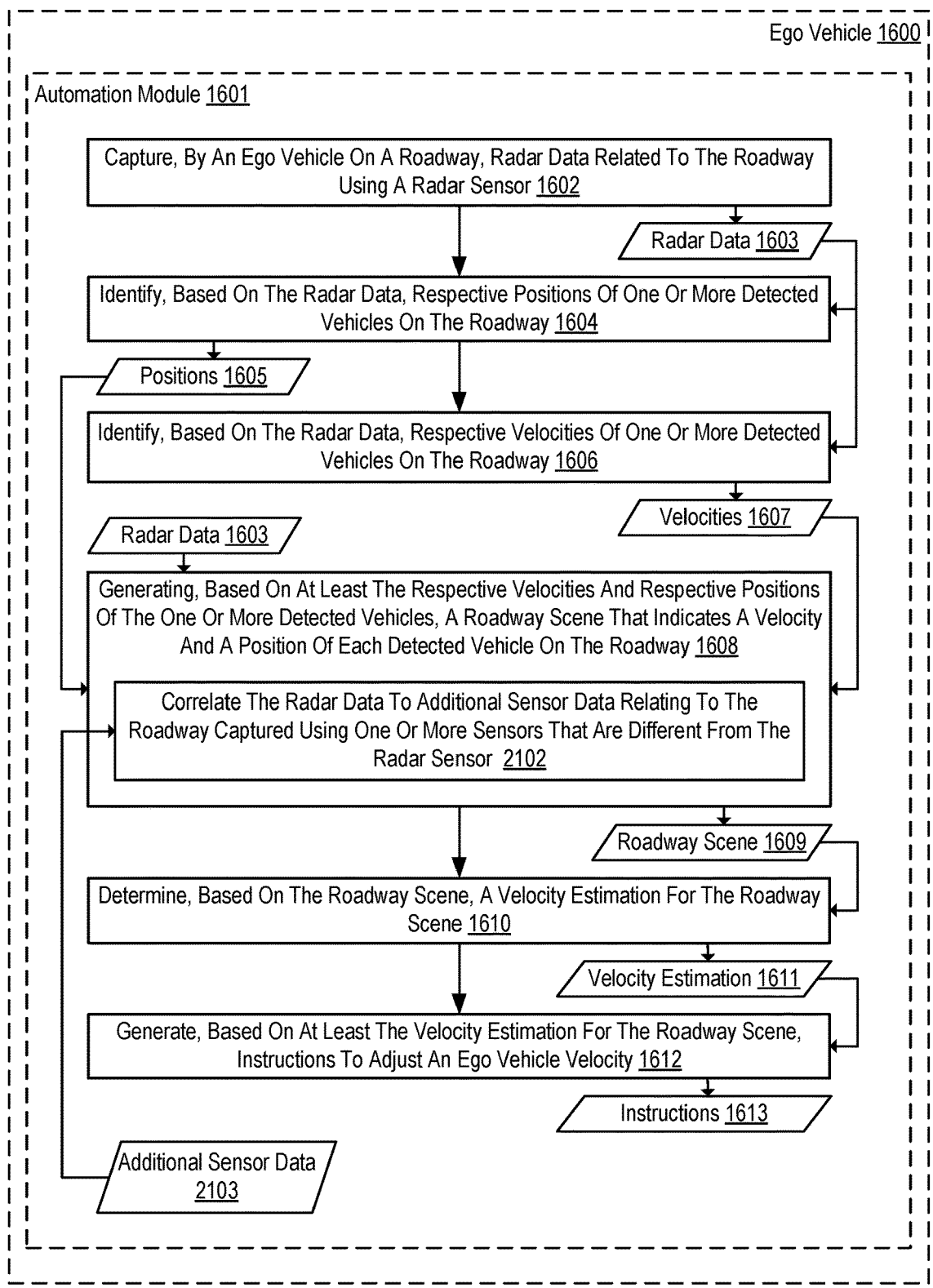
FIG. 21 is a flowchart setting forth another example method of velocity adjustments based on roadway scene comprehension according to some embodiments.

For further explanation, FIG. 21 sets forth a flowchart illustrating an exemplary method for a dynamic velocity adjustment system in accordance with some embodiments. The method of FIG. 21 is similar to the method of FIG. 16 in that the method of FIG. 21 may include many of the same elements. In the method of FIG. 21, generating 1608, based on at least the respective velocities 1607 and respective positions 1605 of the one or more detected vehicles, a roadway scene 1609 that indicates a velocity and a position of each detected vehicle on the roadway also includes correlating 2102 the radar data to additional sensor data relating to the roadway captured using one or more sensors that are different from the radar sensor. In some examples, the automation module 1601 receives visual data from cameras, LiDAR data from a LiDAR sensor, and so on. The automation module 1601 identifies objects from the additional sensor data 2103. For example, the automation module 1601 may recognize a vehicle from visual data based on visual attributes of a vehicle that are present in an image. The additional sensor data, such as visual data, may also include information about driving lanes. For example, the automation module 1601 may visually detect driving lanes from an image of the roadway. In some examples, the automation module 1601 correlates 2102 the radar data 1603 to the additional sensor data 2103 by mapping radar observations identified from the radar data 1603 to objects identified from the additional sensor data 2103. For example, a radar detected vehicle may be correlated to a vehicle detected from visual data. If the lane of that vehicle is also identifiable from the visual data, the radar-detected vehicle can be correlated to a driving lane, as discussed above.

In view of the explanations set forth above, the benefits of a dynamic velocity adjustment system according to embodiments include an adaptive system defined by the roadway scene and not static decisions made prior to a particular journey; a simplified user experience where the user does not have to think about what the following distance or target speed should be for their journey; better safety based on the vehicle not traveling too fast or too slow given the speed of the traffic around it; and improved user comfort stemming from a more natural driving behavior, as the autonomous vehicle will behave more like other drivers around the autonomous vehicle adapting it's speed and following distance to the current traffic conditions.

Exemplary embodiments of the present disclosure are described largely in the context of a fully functional computer system for velocity adjustments based on roadway scene comprehension. The present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others. Any computer system having suitable programming means will be capable of executing the steps of the method of the disclosure as embodied in a computer program product. Although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood that any of the functionality or approaches set forth herein may be facilitated at least in part by artificial intelligence applications, including machine learning applications, big data analytics applications, deep learning, and other techniques. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
controlling an ego vehicle traveling in a first lane, wherein the first lane comprises a lane of travel for the ego vehicle of a multilane roadway including at least the first lane and a second lane;
capturing object ranges by the ego vehicle using at least a first sensor corresponding to a first sensor type;
identifying a first vehicle operating in the second lane from the first sensor;
determining a first velocity of the first vehicle;
generating a first lane flow rate for the second lane from one or more captured object velocities, wherein the first lane flow rate of the second lane is based on at least a traffic density estimation and a weighted average of a plurality of velocities of a plurality of vehicles in the second lane, wherein the plurality of velocities includes the first velocity of the first vehicle;
determining whether to modify an ego vehicle velocity based on the first lane flow rate; and
in response to determining whether to modify the ego vehicle velocity, generating instructions for an ego vehicle velocity.

2. The method of claim 1, wherein determining whether to modify an ego vehicle velocity based on the first lane flow rate includes:
determining, based on the first lane flow rate, to decrease the ego vehicle velocity.

3. The method of claim 1, wherein determining whether to modify an ego vehicle velocity based on the first lane flow rate includes:
determining, based on the first lane flow rate, to increase the ego vehicle velocity.

4. The method of claim 1 further comprising:
identifying a second vehicle operating in the second lane from the first sensor; and
determining a second velocity of the second vehicle;
wherein generating the first lane flow rate is further based on the second velocity.

5. The method of claim 1 further comprising:
identifying a second vehicle operating in a third lane from the first sensor;

determining a second velocity of the second vehicle;
generating a second lane flow rate for the third lane from the captured object velocities, wherein the second lane flow rate of the second lane is based on at least the second velocity of the second vehicle; and
determining whether to modify the ego vehicle velocity based on the first lane flow rate and the second lane flow rate.

6. The method of claim 5 wherein a roadway velocity scene comprises velocity observations from the first lane, the second lane, and the third lane.

7. The method of claim 6, wherein the second lane and the third lane are adjacent to the first lane.

8. The method of claim 7, wherein the roadway velocity scene further comprises velocity observations from a fourth lane, wherein the fourth lane is non-adjacent to the first lane.

9. The method of claim 8, wherein velocity observations from the fourth lane are used to modify the ego vehicle velocity.

10. The method of claim 8, wherein velocity observations from the fourth lane are ignored.

11. The method of claim 1 further comprising:
identifying a second vehicle operating in the first lane from the first sensor;
determining the second vehicle is traveling at a velocity greater than the ego vehicle velocity; and
determining, based on at least the first lane flow rate, to decrease the ego vehicle velocity.

12. The method of claim 1 further comprising:
identifying a first object captured by the first sensor;
determining that the first object is not a vehicle; and
determining to ignore the first object when determining whether to modify the ego vehicle velocity.

13. The method of claim 1 wherein the first sensor comprises a radar sensor.

14. An apparatus comprising a processor, a memory operatively coupled to the processor, the memory having disposed within it program instructions that, when executed by the processor, cause the apparatus to carry out the steps of:
controlling an ego vehicle traveling in a first lane, wherein the first lane comprises a lane of travel for the ego vehicle of a multilane roadway including at least the first lane and a second lane;
capturing object ranges by the ego vehicle using at least a first sensor corresponding to a first sensor type;
identifying a first vehicle operating in the second lane from the first sensor;
determining a first velocity of the first vehicle;
generating a first lane flow rate for the second lane from one or more captured object velocities, wherein the first lane flow rate of the second lane is based on at least a traffic density estimation and a weighted average of a plurality of velocities of a plurality of vehicles in the second lane, wherein the plurality of velocities includes the first velocity of the first vehicle;
determining whether to modify an ego vehicle velocity based on the first lane flow rate; and
in response to determining whether to modify the ego vehicle velocity, generating instructions for an ego vehicle velocity.

15. A method comprising:
capturing, by an ego vehicle on a roadway, radar data related to the roadway using a radar sensor;
identifying, based on the radar data, respective positions of one or more detected vehicles on the roadway;
identifying, based on the radar data, respective velocities of one or more detected vehicles on the roadway;
generating, based on at least the respective velocities and respective positions of the one or more detected vehicles, a roadway scene that indicates a velocity and a position of each detected vehicle on the roadway;
determining, based on the roadway scene, a velocity estimation for the roadway scene based on a weighted average of the respective velocities; and
generating, based on at least the velocity estimation for the roadway scene, instructions to adjust an ego vehicle velocity.

16. The method of claim 15, wherein the respective velocities of the one or more detected vehicles are weighted based on respective distances of the one or more detected vehicles.

17. The method of claim 15, wherein the respective velocities of the one or more detected vehicles are weighted in accordance with respective driving lanes of the one or more detected vehicles.

18. The method of claim 15, wherein the respective velocities of the one or more detected vehicles are weighted in accordance with respective confidence ratings of the respective velocities.

19. The method of claim 15 further comprising:
identifying a minimum forward distance between the ego vehicle and a vehicle in front of the ego vehicle in a driving lane, wherein the minimum forward distance is based on at least one of the velocity estimation of the roadway scene, a traffic density rating, and a road condition;
identifying a current forward distance between the ego vehicle and the vehicle in front of the ego vehicle in the driving lane; and
adjusting, based on at least the minimum forward distance and the current forward distance, the velocity of the ego vehicle.

20. The method of claim 15 further comprising:
determining a traffic density rating for the roadway scene, wherein generating, based on at least the velocity estimation for the roadway scene, instructions to adjust an ego vehicle velocity includes:
generating, based on at least the velocity estimation for the roadway scene and the traffic density rating for the roadway scene, instructions to adjust an ego vehicle velocity.

21. The method of claim 20 further comprising:
selecting, based on at least the traffic density rating, at least one of an acceleration rate and a deceleration rate.

22. The method of claim 15 further comprising:
determining, based on the radar data, a classification of a first vehicle among the one or more detected vehicles;
identifying, based on the radar data, a position of the first vehicle relative to the ego vehicle; and
adjusting, based on at least the classification and the position of the first vehicle, the velocity of the ego vehicle.

23. The method of claim 15, wherein generating, based on the radar data, a roadway scene that includes one or more detected vehicles on the roadway, wherein the one or more detected vehicles are identified from the radar data includes:
correlating the radar data to additional sensor data relating to the roadway captured using one or more sensors that are different from the radar sensor.

24. The method of claim 15, wherein the respective velocities of the one or more detected vehicles are approximated instantaneous velocities.

25. An apparatus comprising a computer processor, a computer memory operatively coupled to the computer processor, the computer memory having disposed within it computer program instructions that, when executed by the computer processor, cause the apparatus to carry out the steps of:
- capturing, by an ego vehicle on a roadway, radar data related to the roadway using a radar sensor;
- identifying, based on the radar data, respective positions of one or more detected vehicles on the roadway;
- identifying, based on the radar data, respective velocities of one or more detected vehicles on the roadway;
- generating, based on at least the respective velocities and respective positions of the one or more detected vehicles, a roadway scene that indicates a velocity and a position of each detected vehicle on the roadway;
- determining, based on the roadway scene, a velocity estimation for the roadway scene based on a weighted average of the respective velocities; and
- generating, based on at least the velocity estimation for the roadway scene, instructions to adjust an ego vehicle velocity.

* * * * *